(12) United States Patent
Santos et al.

(10) Patent No.: US 11,717,784 B1
(45) Date of Patent: Aug. 8, 2023

(54) NATURAL GAS ADSORPTIVE SEPARATION SYSTEM AND METHOD

(71) Applicant: Solid State Separation Holdings, LLC, Dallas, TX (US)

(72) Inventors: Pedro T. Santos, Houston, TX (US); Xuepei Yuan, Humble, TX (US)

(73) Assignee: Solid State Separation Holdings, LLC

( * ) Notice: Subject to any disclaimer, the term of this patent is extended or adjusted under 35 U.S.C. 154(b) by 73 days.

(21) Appl. No.: 17/521,245

(22) Filed: Nov. 8, 2021

Related U.S. Application Data

(60) Provisional application No. 63/112,054, filed on Nov. 10, 2020.

(51) Int. Cl.
*B01D 53/04* (2006.01)

(52) U.S. Cl.
CPC ..... *B01D 53/0446* (2013.01); *B01D 53/0423* (2013.01); *B01D 53/0438* (2013.01);
(Continued)

(58) Field of Classification Search
CPC ............ B01D 53/0446; B01D 53/047; B01D 53/0423; B01D 53/04; B01D 53/14; B01D 14/1406
See application file for complete search history.

(56) References Cited

U.S. PATENT DOCUMENTS

| | | |
|---|---|---|
| 2,978,063 A | 4/1961 | Ford et al. |
| 3,061,992 A | 11/1962 | Russell |

(Continued)

FOREIGN PATENT DOCUMENTS

| | | |
|---|---|---|
| BR | 202016025797 | 5/2018 |
| CA | 2450485 A1 | 11/2003 |

(Continued)

OTHER PUBLICATIONS

Oil & Gas UK, "Atmospheric Emission—Flaring". Taken from http://www.ukooaenvironmentallegislation.co.uk/contents/topic_files/offshore/Flaring.html as accessed on Mar. 9, 2022. 6 Pages.

(Continued)

*Primary Examiner* — Sharon Pregler
(74) *Attorney, Agent, or Firm* — Frederic Dorwart Lawyers, PLLC; Penina Michlin

(57) ABSTRACT

A natural gas adsorptive separation system and method is described. A method of separating natural gas includes directing a natural gas mixture through an activated carbon adsorption tower until the adsorption tower is saturated, collecting methane from the output of the adsorption tower, heating the saturated carbon adsorption tower with adsorbate using a heater and/or a vacuum pump in a closed loop circuit with the carbon adsorption tower until the input to the vacuum pump is within a specified temperature of the output of the heater, lowering the pressure in the heated activated carbon adsorption tower using the vacuum pump to desorb at least one hydrocarbon compound of the plurality of different hydrocarbon compounds, compressing and cooling the desorbed hydrocarbon compound, separating the cooled and compressed hydrocarbon compound into gas and liquid in a fluid separator, and collecting the liquid from the fluid separator.

11 Claims, 13 Drawing Sheets

(52) U.S. Cl.
CPC ............... *B01D 2253/102* (2013.01); *B01D 2257/7025* (2013.01); *B01D 2259/402* (2013.01); *B01D 2259/455* (2013.01)

(56) References Cited

U.S. PATENT DOCUMENTS

| | | | |
|---|---|---|---|
| 3,093,465 A | 11/1963 | Latta | |
| 3,636,679 A | 1/1972 | Batta | |
| 3,689,404 A | 9/1972 | Hofer et al. | |
| 3,884,830 A | 5/1975 | Grant | |
| 3,955,944 A | 5/1976 | Grant | |
| 4,066,423 A | 1/1978 | McGill et al. | |
| 4,305,734 A | 12/1981 | McGill | |
| 4,343,629 A | 8/1982 | Dinsmore et al. | |
| 4,376,639 A | 3/1983 | Vo | |
| 4,376,640 A | 3/1983 | Vo | |
| 4,440,548 A | 4/1984 | Hill | |
| 4,528,000 A | 7/1985 | McGill et al. | |
| 4,670,028 A | 6/1987 | Kennedy | |
| 4,715,867 A | 12/1987 | Vo | |
| 4,715,868 A | 12/1987 | Kennedy | |
| 4,857,078 A | 8/1989 | Watler | |
| 5,154,735 A | 10/1992 | Dinsmore et al. | |
| 5,198,001 A | 3/1993 | Knebel et al. | |
| 5,345,771 A | 9/1994 | Dinsmore | |
| 5,951,741 A | 9/1999 | Dahl et al. | |
| 6,047,747 A | 4/2000 | Bowen et al. | |
| 6,486,375 B1 | 11/2002 | Lenhart et al. | |
| 6,746,515 B2 | 6/2004 | Wegneg et al. | |
| 6,989,103 B2 | 1/2006 | Mohsen et al. | |
| 7,108,070 B2 | 9/2006 | Hall et al. | |
| 7,644,676 B2 | 1/2010 | Lee et al. | |
| 7,914,749 B2 | 3/2011 | Carstens et al. | |
| 8,574,348 B2 | 11/2013 | Struyf et al. | |
| 8,739,569 B2 | 6/2014 | Oka et al. | |
| 8,778,050 B2 | 7/2014 | Dolan et al. | |
| 8,784,535 B2 | 7/2014 | Ravikovitch et al. | |
| 9,174,707 B2 | 11/2015 | Jang et al. | |
| 9,187,996 B1 | 11/2015 | Nevison et al. | |
| 9,382,115 B2 | 7/2016 | Bowe et al. | |
| 9,533,252 B2 | 1/2017 | Boulet et al. | |
| 9,598,946 B2 | 3/2017 | Shomody et al. | |
| 9,631,865 B1 | 4/2017 | Alvarez | |
| 9,771,522 B2 | 4/2017 | Matteucci et al. | |
| 9,835,373 B2 | 12/2017 | Davies et al. | |
| 9,856,197 B2 | 1/2018 | Zubrin et al. | |
| 9,863,581 B2 | 1/2018 | Santos et al. | |
| 9,944,872 B2 | 4/2018 | Matteucci et al. | |
| 9,969,660 B2 | 5/2018 | Iyer et al. | |
| 9,976,091 B2 | 5/2018 | Matteucci et al. | |
| 9,982,516 B2 | 5/2018 | Ricotta | |
| 10,000,704 B2 | 6/2018 | Young et al. | |
| 10,012,062 B2 | 7/2018 | Gupta et al. | |
| 10,017,701 B2 | 7/2018 | Meyer | |
| 10,030,815 B2 | 7/2018 | Fuchs et al. | |
| 10,247,359 B2 | 4/2019 | Tseng et al. | |
| 10,263,265 B2 | 4/2019 | Andrzejak et al. | |
| 10,293,298 B2 | 5/2019 | Marshall et al. | |
| 10,308,326 B2 | 6/2019 | Oh et al. | |
| 10,441,915 B2 | 10/2019 | Ho et al. | |
| 10,487,984 B2 | 11/2019 | Oh et al. | |
| 10,537,844 B2 | 1/2020 | Marshall et al. | |
| 10,738,254 B2 | 8/2020 | Lokhandwala et al. | |
| 2008/0127673 A1 | 6/2008 | Bowen et al. | |
| 2008/0141714 A1* | 6/2008 | Cartwright ........... | B01D 53/229 62/619 |
| 2010/0038907 A1 | 2/2010 | Hunt et al. | |
| 2010/0205979 A1 | 8/2010 | Gentry et al. | |
| 2011/0067439 A1 | 3/2011 | Bridgwood | |
| 2011/0272151 A1 | 11/2011 | Matzakos | |
| 2013/0186132 A1 | 7/2013 | Banszky | |
| 2013/0213085 A1 | 8/2013 | Ward | |
| 2013/0298572 A1 | 11/2013 | Mak | |
| 2014/0274659 A1 | 9/2014 | Romanos et al. | |
| 2014/0310049 A1 | 10/2014 | Goel et al. | |
| 2014/0366577 A1 | 12/2014 | Zubrin et al. | |
| 2015/0299596 A1 | 10/2015 | Sethna et al. | |
| 2015/0324714 A1 | 11/2015 | Shao et al. | |
| 2016/0178127 A1 | 6/2016 | Oh et al. | |
| 2016/0216030 A1 | 7/2016 | Truong et al. | |
| 2016/0230519 A1 | 8/2016 | Leniek, Sr. et al. | |
| 2016/0340595 A1 | 11/2016 | Matteucci et al. | |
| 2016/0369611 A1 | 12/2016 | Bragg | |
| 2018/0045460 A1 | 2/2018 | Zubrin et al. | |
| 2018/0214816 A1 | 8/2018 | Greenbank | |
| 2018/0259248 A1 | 9/2018 | Repasky | |
| 2018/0265769 A1 | 9/2018 | Nevison | |
| 2019/0041004 A1 | 2/2019 | Krueger et al. | |
| 2019/0193818 A1 | 6/2019 | Oh et al. | |
| 2019/0249828 A1 | 8/2019 | Subreville et al. | |
| 2019/0351365 A1 | 11/2019 | Ho et al. | |
| 2020/0002628 A1 | 1/2020 | Dugas et al. | |
| 2020/0087591 A1 | 3/2020 | Cavness et al. | |
| 2020/0190925 A1 | 6/2020 | Shuck | |
| 2020/0247440 A1 | 8/2020 | Yuki et al. | |

FOREIGN PATENT DOCUMENTS

| | | |
|---|---|---|
| CN | 1019139 B | 11/1992 |
| CN | 1091459 A | 8/1994 |
| CN | 2571762 A1 | 9/2003 |
| CN | 101575532 B1 | 4/2013 |
| CN | 202868303 A | 4/2013 |
| CN | 103540335 A1 | 1/2014 |
| CN | 105627694 B | 6/2016 |
| CN | 106764410 A | 5/2017 |
| CN | 207091357 A1 | 3/2018 |
| CN | 106838605 B | 9/2018 |
| CN | 108960699 A | 12/2018 |
| CN | 109404079 A | 3/2019 |
| CN | 109472475 A | 3/2019 |
| CN | 107366829 B | 8/2019 |
| CN | 107461601 B | 10/2019 |
| CN | 111188992 A | 5/2020 |
| EP | 0147277 A1 | 3/1985 |
| EP | 2442056 A2 | 4/2012 |
| EP | 1715240 B1 | 7/2019 |
| EP | 3514466 A2 | 7/2019 |
| EP | 3428053 B1 | 2/2020 |
| GB | 2348437 A1 | 10/2000 |
| GB | 2450565 A1 | 12/2008 |
| JP | 2007085403 A | 4/2007 |
| JP | 2014122284 A1 | 7/2014 |
| KR | 20140056844 A | 5/2014 |
| KR | 20160091784 A | 8/2016 |
| KR | 20160091785 A | 8/2016 |
| KR | 101707515 B1 | 2/2017 |
| KR | 20180046102 A | 5/2018 |
| MY | 155711 A | 11/2015 |
| RU | 2688151 C1 | 5/2019 |
| RU | 2688151 C1 | 2/2020 |
| RU | 2718073 C1 | 3/2020 |
| RU | 2727503 C1 | 7/2020 |
| WO | 2001016059 A1 | 7/2001 |
| WO | 2013162965 A1 | 10/2013 |
| WO | 2017184708 A1 | 10/2017 |
| WO | 2018085076 A1 | 5/2018 |
| WO | 2019009745 A1 | 1/2019 |
| WO | 2019095031 A1 | 5/2019 |

OTHER PUBLICATIONS

Knizhnikov, A; Poussenkova, N., Russian associated gas utilization: problems and prospects. Annual Project Report Environment and Energy: International Context Issue 2009, 1.

US Energy Information Administration, "Natural Gas". Taken from http://www.eia.gov/naturalgas/data.cfm as accessed on Mar. 9, 2022. 11 pages.

Oil & Gas Eurasia, "Flaring Up—Companies Pay High Costs to be Green", https://www.oilandgaseurasia.com/en/tech_trend/flaring-companies-pay-high-costs-be-green. Website inaccessible as of Mar. 9, 2022.

(56) References Cited

OTHER PUBLICATIONS

US Energy Information Administration, "Natural Gas Processing: The Crucial Link Between Natural Gas Production and Its Transportation to Market". Office of Oil and Gas 2006, 1-11.

Malumfashi, G. I., "Phase-out of gas flaring in Nigeria by 2008: The prospects of a multi-win project (Review of the Regulatory, Environmental and Socio-Economic Issues)". Petroleum training journal 2007, 1 (1).

Røland, T. H., "Associated petroleum gas in Russia: reasons for non-utilization". FNI Report 13. 2010.

Lapin, D. G.; Formin, D. A., "Utilization of Associated Petroleum Gas". Institute of Oil and Gas. ND. YΠk 735.29.

Holland, C. E.; Al-Muhtaseb, S. A; Ritter, J. A., "Adsorption of C1-C7 normal alkanes on BAX activated carbon. 1. Potential theory correlation and adsorbent characterization". Ind Eng Chem Res 2001, 40 (1), 338-346.

Al-Muhtaseb, S. A.; Holland, C. E.; Ritter, J. A., "Adsorption of C1-C7 Normal Alkanes on BAX-Activated Carbon. 2. Statistically Optimized Approach for Deriving Thermodynamic Properties from the Adsorption Isotherm". Ind Eng Chem Res 2001, 40 (1), 319-337.

Arutyunov, V. S., "Utilization of associated petroleum gas via small-scale power generation". Russian Journal of General Chemistry 2011, 81 (12), 2557-2563.

Wong, S.; Keith, D.; Wichert, E.; Gunter, B.; McCann, T. "Economics of Acid Gas Reinjection: An innovative CO2 storage opportunity". Proceedings of the 6th Greenhouse Gas Control Conference, Kyoto, Japan. Kyoto: Oxford UK, 2003.

Walton, K. S.; Cavalcante Jr, C. L.; Levan, M. D., "Adsorption of light alkanes on coconut nanoporous activated carbon". Brazilian Journal of Chemical Engineering 2006, 23 (4), 555-561.

Dabrowski, A., "Adsorption—from theory to practice". Advances in Colloid and Interface Science 2001, 93 (1-3), 135-224.

Malek, A.; Faroq, S., "Comparison of isotherm models for hydrocarbon adsorption on activated carbon". AlChE Journal 1996, 42 (11), 3191-3201.

Carrington, K. R., "Recommended Best Practices for the Characterization of Storage Properties of Hydrogen Storage Materials". H2 Technology Consulting: V3.34. Feb. 21, 2012.

Sircar, S., "Basic research needs for design of adsorptive gas separation processes". Ind Eng Chem Res 2006, 45(16), 5435-5448.

\* cited by examiner

NATURAL GAS ADSORPTIVE SEPARATION SYSTEM AND METHOD

CROSS REFERENCE TO RELATED APPLICATIONS

This application claims the benefit of U.S. Provisional Application No. 63/112,054 to Santos et al., filed Nov. 10, 2020 and entitled "NATURAL GAS ADSORPTIVE SEPARATION SYSTEM AND METHOD," which is hereby incorporated by reference in its entirety.

BACKGROUND OF THE INVENTION

1. FIELD OF THE INVENTION

Embodiments of the invention described herein pertain to the field of processing and transporting associated hydrocarbon gas. More particularly, but not by way of limitation, one or more embodiments of the invention enable a natural gas adsorptive separation system and method.

2. DESCRIPTION OF THE RELATED ART

Natural gas is often found in association with oil at production sites such as wellheads. The associated natural gas is typically a combination of methane, ethane, propane, butane, isobutane, pentane, natural gasoline, and various other impurities. Natural gas is conventionally most useful if it is treated to meet pipeline or liquefaction specifications, however these specifications typically require the gas consist primarily of methane with other impurities removed. High methane content natural gas may also be used as high quality automotive fuel (SAEJ1616), or for consumption in dual fuel or bi-fuel engines where the low content of ethane+ allows for more complete combustion of the natural gas or in grid scale generation with a high methane number in a lean-burn combustion engine.

Similarly, natural gas liquids (NGL) are also beneficial if they are separated into their individual constituents. For example, ethane may be sold as petrochemical feedstock to make ethylene, used as a heating fuel in ethane burners or as fuel for power generation. Propane may be sold as fuel for heating in industrial applications such as asphalt plants, grain dryers and vehicular fuel. Propane is also sold as petrochemical feedstock to make propylene. Butane may be blended with propane in order to be sold as LPG, used as a high-octane gasoline blendstock in the winter months, or further processed through an isomerization unit in a refinery to convert it into isobutane. Isobutane may be sold locally as a refrigerant, may be blended with propane and butane to be commercialized as LPG for industrial and commercial heating. Isobutane is also a valuable gasoline additive, reacted in order to make isooctane and increase the octane rating of gasoline. Pentane can be sold as a styrene foam blowing agent or as a component of natural gasoline for blendstock. Natural gasoline may be sold to a refinery as a denaturant for fuel-grade ethanol, blended into gasoline directly, or transported in conventional rail oil tank cars when in high purity due to the low Reid Vapor Pressure (RVP).

However, it is often uneconomical to treat, purify and separate natural gas and NGLs at the wellsite, and transportation costs from remote wellsite locations can be significant. Most wellsite treatment methods require complicated, non-portable equipment with high capital costs. Therefore, wellsite processing or transportation is typically only economical for wells with high gas volumes. For example, refrigeration systems are not appropriate for small scale wells that produce less than 1 billion BTUs per day. In addition, refrigeration systems are ineffective where the ethane content is high (greater than 8%), because the achieved process temperatures are not sufficiently low to condense significant quantities of ethane. A further drawback is that refrigeration systems are also costly and lack portability. Similarly, cryogenic turbo-expansion systems, although commonly used by gas processing companies, are only economically applied for systems of at least 50 MMscfd (million standard cubic feet per day). Joule-Thompson valves require high pressure wellheads or expensive compression systems and achieve a low percentage separation efficiency, especially for low molecular weight hydrocarbons, while at the same time requiring lower pressures downstream, limiting the conditions under which these systems are practical.

As a result of these difficulties, a significant portion of natural gas from wellheads is flared (wasted rather than used). The gas flared in the United States in 2011 could have provided enough gas to heat 2.9 million American homes. According to the US Energy Information Administration, in 2013, the United States flared and vented 260,394 million standard cubic feet (MMscf) of natural gas. This wasteful practice has continually increased to 469,347 MMscf by 2018. This equates to over 481 trillion BTUs of energy, which would provide more energy than the entire cement industry, the most energy-intensive manufacturing industry, consumes in a year. In addition to wasting natural resources, flaring also produces a significant amount of greenhouse gas emissions.

The energy industry lacks effective technologies to separate and recover associated gas from crude oil production. The construction cost of long-distance pipeline has hindered the capture of associated gas in remote areas. Further, despite the multiple potential methods to manage associated gas, only a few such methods are used in practice. For example, the gas can be sold in natural gas distribution networks after low-temperature cryogenic condensing processes, used for on-site electricity generation via engines or turbines, re-injected for enhanced oil recovery, or converted into liquid feedstock via advanced chemical reactions. However, on-site electricity generation requires the construction of electrical storage equipment or an expensive interconnection to the long-distance electrical transmission network, and even then, the generator usually has relatively low energy conversion efficiency and high capital and operating expenses. Reinjecting gas into the well may cause the gas to condense, and the condensed liquid tends to make flow tortuous within the reservoir, making extraction even more difficult. Gas to liquid conversion, monetization and related refinery processes require specific and expensive catalysts to convert gas into ambient temperature liquids, oxides or olefins, and these routes have not-yet been successfully commercialized at rates less than 50 MMscfd due to the low chemical reactivity capabilities of methane. The cryogenic treatment must operate on the entire gas stream to condense the less volatile alkanes, which is a capital-intensive and energy consuming process. To summarize, all these methods require complicated equipment, strict application conditions, and are not portable.

To date, it has been proposed to use adsorption to separate the components of associated natural gas at the wellsite. For example, some attempts have been made to use pressure-swing adsorption or temperature-swing adsorption to process associated gas in remote wellsite locations. However, the currently proposed processes suffer from the problem that they have not been efficient enough to handle gas volumes as low as 10,000 standard cubic feet per day. Typical gas processing plants for processing ethane starts at 30 Million standard cubic feet per day (MMscfd) and fractionation plants start at around 300 MMscfd. Further, these currently proposed processes and are not efficient enough to meet stringent gas quality requirements, or to conduct targeted fractionation where there are specific, high-value regional markets. Although mechanical refrigeration units (MRUs) can economically operate at 3-10 MMscfd, they are only capable of removing up to 25% of the relative inlet ethane concentration (i.e. from 8% inlet to 6% outlet).

As is apparent from the above, there is a need for a natural gas separation technique that is portable, has low capital cost, is economical for low gas volumes, and capable of selective fractionation in order to reduce flaring and allow high quality compressed natural gas (CNG) and natural gas liquids (NGL) output that has low Reid vapor pressure (RVP). Therefore, there is a need for an improved natural gas adsorptive separation system and method.

BRIEF SUMMARY OF THE INVENTION

One or more embodiments of the invention enable a natural gas adsorptive separation system and method.

A natural gas adsorptive separation system and method is described. An illustrative embodiment of a natural gas separation system includes two or more adsorbent towers coupled to a set of switches, the set of switches (valves) directing a natural gas inlet flow through one of a first adsorbent tower of the two or more adsorbent towers when the set of switches are in a first position, or a second adsorbent tower of two or more adsorbent towers when the set of switches are in a second position, the first position further coupling the second adsorbent tower to a closed-loop circuit, comprising a vacuum pump (or for example a fluid differential pressure pump) and a heater, wherein gaseous fluid circulates through the second adsorbent tower, the fluid vacuum pump and heater in a loop until the inlet of the vacuum pump is within a selected temperature of the output of the heater, the first position further coupling the second adsorbent tower to a desorption circuit including the vacuum pump (or for example a fluid differential pressure pump), a compressor, a heat exchanger, and a gas-liquid separator, and a series of valves that select between the closed-loop circuit and the desorption circuit in the first position, wherein in the first position methane and/or other selected lighter components such as nitrogen, ethane and/or propane exit the first adsorbent tower through an outlet, and natural gas liquids exit the separator when the desorption circuit is selected. In some embodiments, the natural gas inlet flow is gas output from an MRU. In certain embodiments, the desorption circuit is located on a mobile unit. In some embodiments, the pair of adsorbent towers comprise activated carbon adsorbent.

An illustrative embodiment of a method of separating natural gas includes directing a natural gas mixture comprising a plurality of different hydrocarbon compounds through an activated carbon adsorption tower, which may also include zeolites, molecular sieves, metal organic frameworks among others, until the activated carbon adsorption tower is saturated, collecting methane and/or the selected combination of methane, ethane and/or propane from the output of the adsorption tower, heating the saturated carbon adsorption tower with adsorbate (gas that would have otherwise been adsorbed) using a heater and a vacuum pump in a closed loop circuit with the carbon adsorption tower until the input to the vacuum pump is within a specified temperature of the output of the heater, lowering the pressure in the heated activated carbon adsorption tower using the vacuum pump to desorb at least one hydrocarbon compound of the plurality of different hydrocarbon compounds, compressing, cooling and condensing the desorbed at least one hydrocarbon compound, separating the cooled and compressed at least one hydrocarbon compound into gas and/or liquid in a fluid separator, and collecting the liquid from the fluid separator. Fractionation by selective desorption may occur by starting at the lowest heat and highest pressure and working up to the highest heat and lowest pressure to control desorption. In this manner, selective ejection and removal by desorption may be accomplished. In some embodiments, lowering the pressure and/or increasing the heat in the activated carbon adsorption tower occurs in stages to selectively desorb an individual hydrocarbon compound of the plurality of hydrocarbon compounds. In certain embodiments, the method further includes repeating the heat increase and lowering the pressure to selectively desorb a series of individual hydrocarbon compounds of the plurality of hydrocarbon compounds one at a time. In some embodiments, the method further includes mixing the liquid with oil. In certain embodiments, the method further includes cooling the activated carbon adsorption tower with at least a portion of the cooled and compressed at least one hydrocarbon compound to prepare the activated carbon adsorption tower for adsorption. A better capture efficiency may be achieved by starting with a cool carbon sorbent. In some embodiments, the method further includes a second activated carbon adsorption tower, wherein the first and second activated carbon adsorption tower alternate between adsorption and desorption in a continuous cycle.

An illustrative embodiment of a method of separating individual hydrocarbons from a mixed stream of hydrocarbons includes directing a hydrocarbon mixture comprising a plurality of different hydrocarbon compounds through an activated carbon adsorption tower, controlling which hydrocarbons of the plurality of different hydrocarbons are adsorbed by the activated carbon adsorption tower by controlling the temperature and pressure within the activated carbon adsorption tower, collecting hydrocarbons that are not adsorbed by the activated carbon adsorption tower from the output of the activated carbon adsorption tower, and heating and/or lowering the pressure in the activated carbon adsorption tower in stages to desorb previously adsorbed hydrocarbons one at a time by type or carbon number.

In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings in which.

Figure 1A:
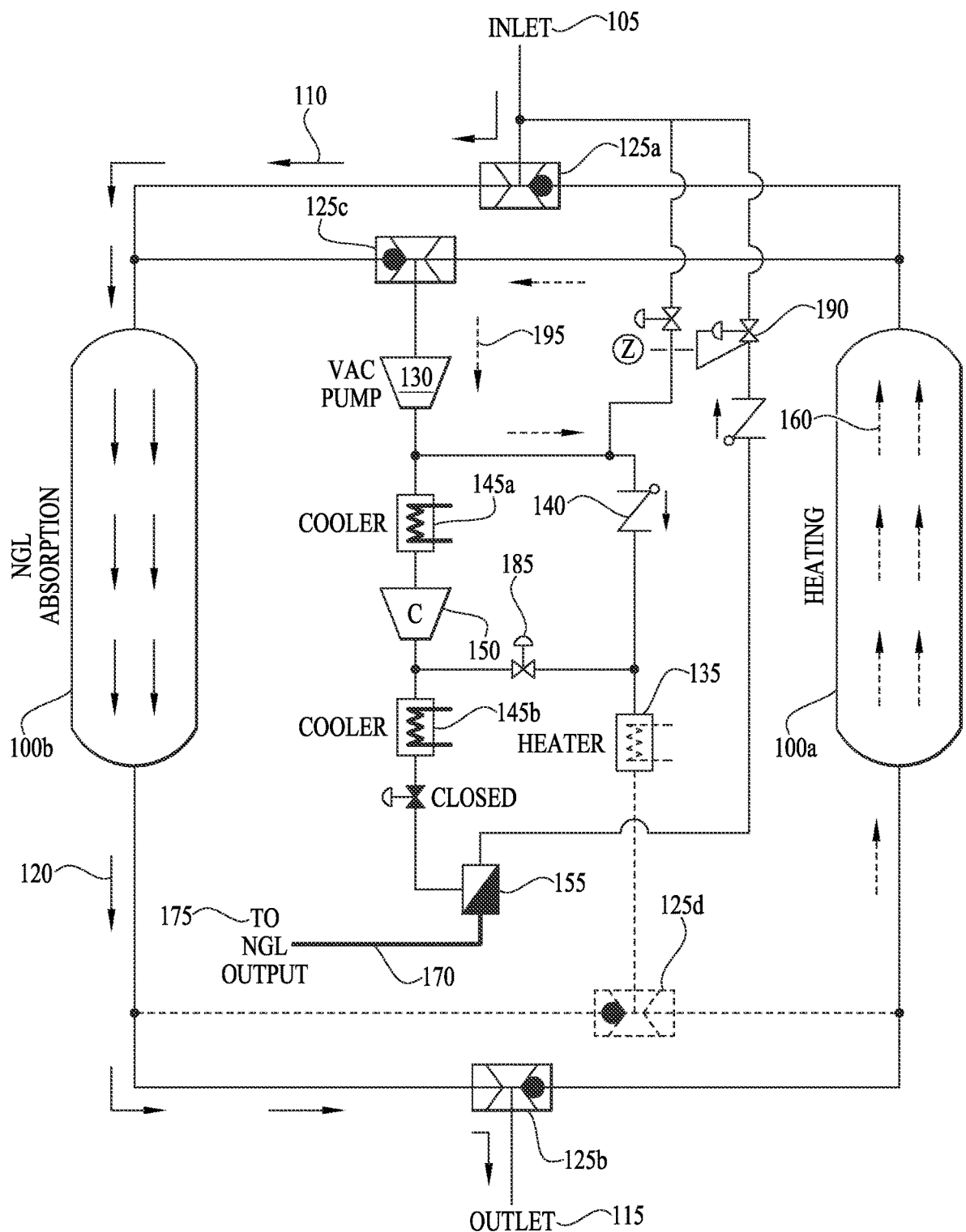
FIGS. 1A-1D are schematic diagrams of a dual tower natural gas adsorption system of illustrative embodiments.

While the invention is susceptible to various modifications and alternative forms, specific embodiments thereof are shown by way of example in the drawings and may herein be described in detail. The drawings may not be to scale. It should be understood, however, that the embodiments described herein and shown in the drawings are not intended to limit the invention to the particular form disclosed, but on the contrary, the intention is to cover all modifications, equivalents and alternatives falling within the scope of the present invention as defined by the appended claims.

DETAILED DESCRIPTION

A natural gas adsorptive separation system and method will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

As used in this specification and the appended claims, the singular forms "a", "an" and "the" include plural referents unless the context clearly dictates otherwise. Thus, for example, reference to an adsorption tower includes one or more adsorption towers.

As used in this specification and the appended claims, "low volume" means 50,000 standard cubic feet per day or less.

As used in this specification and the appended claims, "automatic" means occurring without human intervention.

As used in this specification and the appended claims, "high-quality" means at least 90% purity of the specified fluid.

In the art of hydrocarbon treatment, hydrocarbon compounds having two carbon atoms in a molecule of the referenced hydrocarbon are typically referred to as C2, hydrocarbon compounds having three carbon atoms in a molecule of the particular hydrocarbon are referred to as C3, etc. For example, methane may be referenced as C1, ethane as C2, propane as C3, etc. The annotation C2+ refers to hydrocarbon compounds having two or more carbon atoms per molecule of the hydrocarbon, such as ethane, propane, butane and heavier hydrocarbons.

One or more embodiments of the invention provide a natural gas adsorptive separation system and method. While for ease of description and so as not to obscure the invention, illustrative embodiments are described in terms of separation of associated gas produced at a wellsite, nothing herein is intended to limit the invention to that embodiment. The invention may be applied equally to natural gas and/or natural gas liquids from other sources and/or may be used for the separation of other impurities such as water or hydrogen sulfide.

Illustrative embodiments may separate an associated gas stream including a mixture of methane (C1), ethane (C2), propane (C3), butane (C4), isobutane (C4), pentane (C5) and/or natural gasoline (C5+) using an improved adsorption, absorption and desorption process. Illustrative embodiments may provide a comprehensive solution to process associated gas for small scale applications and/or may complement a refrigeration system. Precise temperature and pressure swing methods may control adsorption and desorption to purify and fractionate natural gas mixtures in order to minimize the cost of processing while maximizing the value of downstream products. Illustrative embodiments may eliminate or reduce the need for flaring. Illustrative embodiments may have low capital cost, may be portable, economical for low gas volumes, and capable of selective fractionation in order to reduce flaring and allow high quality CNG and NGL output that has low Reid vapor pressure (RVP).

Illustrative embodiments may separate a mixed gas stream at ambient temperatures using an activated carbon adsorbent/absorbent. The higher binding energy of heavy alkanes may result in their selective removal from the inlet gas stream. As a mixed gas stream flows through an adsorption tower, initially lighter hydrocarbons may be adsorbed, but the lighter hydrocarbons are replaced with heavier hydrocarbons as flow progresses. Multiple adsorbent columns may alternate between being loaded and being regenerated after saturation with the heavier hydrocarbons. Rather than thermally treating the entire gas stream, only the heavier alkanes that have been trapped within the sorbent may be heated by circulating adsorbate as a heat carrying fluid. High pressure (e.g., 10 PSIG, 10 inHg or 20 inHg) may be circulated to add heat to the carrying fluid. For example, if pressure is increased, the fluid density may be increased, and as a result the circulating fluid has the ability to carry more heat per unit of volume. Once the adsorbent is hot, a vacuum or lower pressure may be applied in the adsorbent tank for regeneration. Methane may flow through the adsorbent without reacting (or the adsorbent may be selected such that methane and ethane flow through). Ethane, propane and butane may be adsorbed by the activated carbon sorbent, and the heavier isotopes C5+ may be absorbed by the sorbent. Once the methane is initially separated, the C2+ isotopes may be selectively released from the activated carbon by methodically controlling the temperature and pressure of the regeneration cycle in a desorptive fractionation process.

In order to recover the trapped hydrocarbons respectively, sorbents may be heated step by step, and a vacuum and/or reduction in pressure gradually applied. Ethane may then be released and ejected firstly due to its smaller dimension and weaker interaction with sorbents. Then C3 and C4 may be released subsequently. Finally, heavier hydrocarbons (C5+) may be released individually through heating and vacuuming and/or reduction of pressure. A technical vacuum may not be required and/or it may not be necessary to reduce the pressure below atmospheric pressure, depending on the particular hydrocarbon. For example, stubborn hydrocarbons, such as C6 or C7 and heavier, may be present in small fractions but accumulate over many cycles. In such instances, a monitored supervised cycle may be conducted by increasing temperature to flush out those molecules, which may be present in 0.02% of a mole. Pressure may then be reduced. The most stubborn hydrocarbons may only use a fraction of 1% of carbon capacity. Alternatively, the activated carbon may be replaced after a certain number of cycles, or periodically regeneration may be conducted offsite to remove stubborn heavier hydrocarbons. A nitrogen environment may be employed at high pressures so even if there are leaks, the hydrocarbons may not ignite. Care must be taken since heavier carbons have a lower temperature of autoignition.

A two-column device with an automatic controller that switches between columns may allow the adsorption system of illustrative embodiments to operate continuously. While one column is running for adsorption, the other column may be under regeneration with a vacuum pump. From the outlet on the bottom of the adsorption column, the pipeline quality natural gas may be released and transported into a gas pipeline network. At the outlet of the vacuum pump the C3+ or C2+ rich gas may be collected for further usage. An industrial-scale portable system may successfully convert well head associated gas into high-quality (at least 90% methane) automotive grade natural gas suitable for high-efficiency engines while simultaneously producing one or more separate streams of valuable heavy hydrocarbons (i.e., propane, butane, pentane, etc.).

Illustrative embodiments may provide high deliverability of heat using pressurized fluid. Rather than heating the entire gas stream, only the heavier hydrocarbons within the adsorption tower may be heated. A slip stream of gas coming through the inlet may maintain a heat of desorption during the desorption step. After desorption, the adsorption tower may be cooled using at least a portion of cooled and compressed desorbed gas.

Illustrative embodiments may be paired with the output of a mechanical refrigeration unit (MRU) to polish the output of the MRU. MRU's typically do not remove enough ethane from the natural gas to meet pipeline specifications. MRUs are inefficient where the ethane content is high, since MRUs do not reach low enough temperatures to condense significant quantities of ethane (more than 25%). The adsorption system of illustrative embodiments may process the gaseous output of the MRU to adjust the ethane content or collect more propane in order to generate a high methane content gas output and a lower value Y-grade that can be used as specialty fuel. In some embodiments, illustrative embodiments may polish the output of a Joule-Thomson (J-T) unit.

In some embodiments a stationary adsorption unit may be paired with mobile regeneration. A mobile regeneration unit may serve multiple adsorption sites. In some embodiments, natural gas liquids separated in the system of illustrative embodiments may be mixed with oil to improve oil production percentage, and taken away by oil tankers.

An adsorbent of illustrative embodiments may be layers of high porous activated carbons. Zeolites, molecular sieves, metal organic frameworks and/or alumina may also be employed as adsorbents. An adsorbent may be selected by sizing the micropores and mesopores of activated carbon by tuning the average pore size to the average dynamic diameter of the molecule of interest. It may not be desirable for the molecule diameter to be smaller than the average pore size since doing so may leave too much empty space in the sorbent. Exemplary adsorbents are offered by Cabot (Georgia, USA), Calgon Carbon Corporation (Pennsylvania, USA), and Ingevity (South Carolina, USA). Adsorbents employed in the adsorbent towers herein may be the adsorbents described as natural gas storage materials in U.S. Pub. No. 2014/0274659 to Romanos et al., which is hereby incorporated by reference in its entirety, provided that in the event of a conflict, the present disclosure shall prevail. Adsorbents may be packed inside columns (towers) with two open ends. An orifice and pressure regulator may provide precise gas flow through the column. A back-pressure regulator may place the system under a presetting pressure. A heating element with a temperature controller may generate heat on the adsorbent for temperature swing adsorption. The connection of a vacuum pump may favor the generation ability for the adsorbents.

Illustrative embodiments may include a dual-tower adsorption apparatus that may operate in a cyclic four-step process. FIGS. 1A-1D illustrate an exemplary adsorption process of illustrative embodiments. In FIG. 1A it is assumed that adsorption tower 100a has previously adsorbed natural gas from natural gas inlet 105. As shown in FIG. 1A, a mixed natural gas stream 110 including methane, ethane, propane, butane, pentane and/or C1+ hydrocarbons entering inlet 105 and flowing through adsorption tower 100b. As illustrated in FIG. 1A, shuttle valve 125a is switched to direct mixed natural gas 110 towards adsorption tower 100b, rather than tower 100a. Adsorption towers 100a, 100b may include layers of sorbents, for example activated carbon, molecular sieves, metal organic frameworks (MOFs), or zeolites. Adsorbents within adsorption towers 100a, 100b may be selected such that methane 120 flows through adsorption tower 100b without adsorbing or absorbing and exits through outlet 115, which may be coupled to a natural gas pipeline, storage container, virtual pipeline, truck or other methane collection, storage and/or distribution means. The methane 120 exiting through outlet 115 may be about 90% methane, or sequential cycles may be employed for ultrahigh purity, such as 99.7% pure methane. In some embodiments, gas exiting through outlet 115 may be a mixture of one or more of methane, ethane or propane and this composition may be selectable by modifying the adsorbent as described herein. Small percentages (e.g., 10% or less) of other gases, such as water vapor, nitrogen and/or ethane may still be present in methane 120, although methane 120 may have high enough quality to meet pipeline specifications. Shuttle valve 125b may direct methane 120 exiting adsorption tower 100b through outlet 115. A valve recirculation circuit may take some of the circulating gas to slowly repressurize the circuit.

Also shown in FIG. 1A, adsorption tower 100a may be heated while tower 100b is adsorbing. Heating may be accomplished in a closed-loop circuit by circulating adsorbate (residual gas) remaining in adsorption tower 100a after the adsorption phase. The initial temperature of adsorption tower 100a and incoming gas may be about 10-30° C. As adsorption tower 100a becomes hotter, some adsorbed hydrocarbons may begin to desorb and begin to partially pressurize adsorption tower 100a. Adsorption tower 100a may heat until it reaches the appropriate temperature to desorb the desired hydrocarbons, for example 200° C. for C3 and C4. Closed-loop circuit 195 may be the loop including adsorption tower 100a, vacuum pump 130, and heater 135. Shuttle valves 125c and 125d may be set to form the heating loop for adsorption tower 100a, rather than adsorption tower 100b. Check valve 140 may ensure that fluid flows in only a single direction, in this example counter-clockwise, around closed-loop 195. Heating around the closed loop circuit 195 illustrated in FIG. 1A may stop once the temperature of the vacuum pump 130 inlet is within about 10-20° C. of the temperature of the heater 135 output.

Figure 1B:
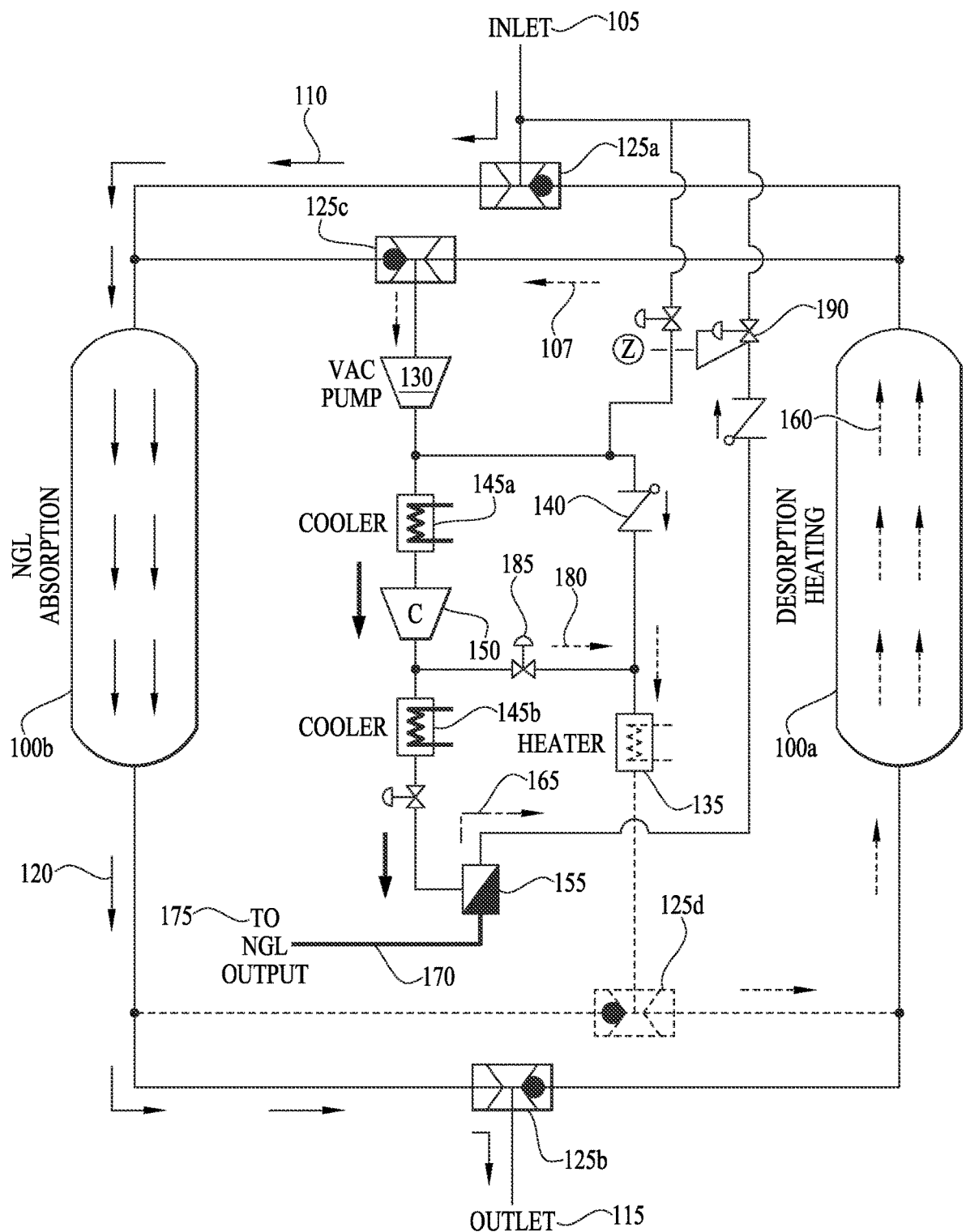

FIG. 1B illustrates a desorption step of illustrative embodiments. In FIG. 1B, adsorption tower 100b continues to be in the adsorption phase. Adsorption tower 100a is included in desorption circuit 107. A controller may select between the closed-loop heating circuit of FIG. 1A and the desorption circuit 107 of FIG. 1B by operating one or more valves (not shown). As illustrated, desorption circuit 107 includes adsorption tower 100b, vacuum pump 130, cooling heat exchanger 145a, compressor 150, cooling heat exchanger 145b and separator 155. In some embodiments, cooling heat exchanger 145a may not be necessary. Hydrocarbons 160 desorbing from adsorption tower 100a after the heating step of FIG. 1A, may be pumped by vacuum pump 130 to cooling heat exchanger 145a, which may be a pre-cooler for compressor 150. The hydrocarbons 160 may then be compressed by compressor 150, and then cooled a second time by cooling heat exchanger 145b. Separator 155 may then receive hydrocarbons 160 from second cooling heat exchanger 145b. Separator 155 may separate hydrocarbons into gas 165 and liquid 170. Liquid 170 may be the desired natural gas liquids (NGL), which may be collected, stored and/or transported via NGL output 175. NGL output 175 may be one or more of ethane, propane, butane, pentane or heavier hydrocarbons, depending on the desorption pressure and/or temperature selected. A portion of compressed gas exiting compressor 150 may be diverted through control valve 185 as slip stream 180. Slip stream 180 may be circulated back to adsorption tower 100a prior to entering second heat exchanger 145b and/or prior to entering separator 155. Slip stream 180 may be partially cooled gas that is heated in heater 135 and then circulated back to adsorption tower 100a to add heat in order to maintain heat of desorption and ensure that adsorption tower 100a does not become too cold prior to complete or substantially complete desorption of the desired liquid hydrocarbons 170 being collected at NGL output 175.

Cooling heat exchangers 145a, 145b may be air heat exchangers, shell and tube heat exchangers, plate heat exchangers, or any other suitable heat exchanger known to those of skill in the art. Separator 155 may separate gas 165 and liquid 170 based on the differing densities. Gas 165 exiting separator 155 may return to natural gas inlet 105 if the gas 165 does not condense. Back pressure control valve 190 may maintain a back pressure during NGL separation. A fluid moving pump or compression device may be employed, for example, a centrifugal pump, positive displacement pump, piston, rotary piston, or lobes (fixed volume displacements). For net differential, a centrifugal pump may be beneficial since the impeller will impart energy to result in a discharge pressure. A variable speed centrifugal pump may be operated for high inlet pressures at low speeds to generate head (pressure). For operating at low pressures, higher speeds may be employed to compensate for the need to generate more head. In another example, positive displacement pump may move a physical volume independent of the pressure. The heater may be a low-pressure plate type heat exchanger or shell and fin heat exchanger. A shell and tube heat exchanger may be employed where higher pressures are maintained. Other heaters well known to those of skill in the art may be employed.

Figure 1C:
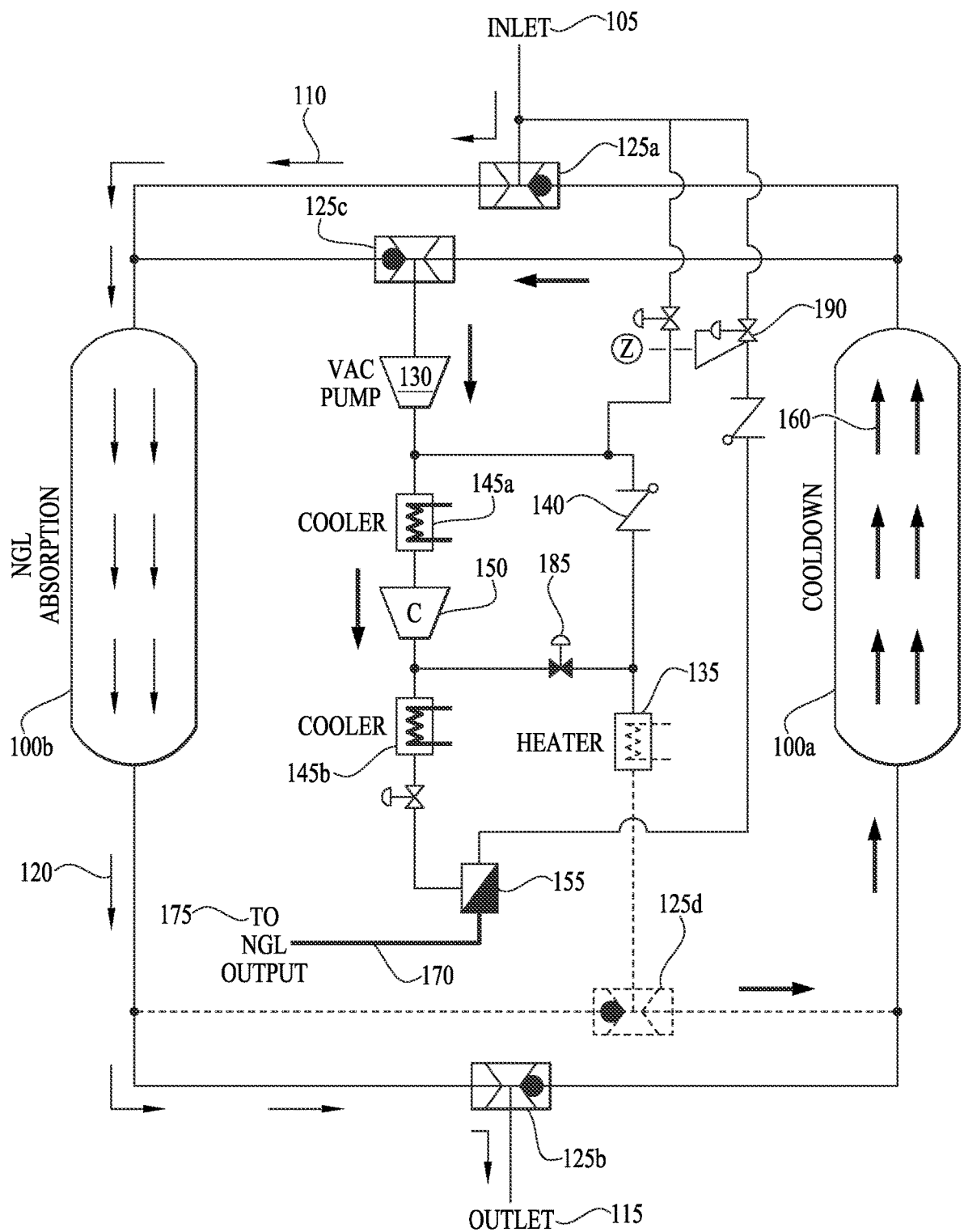

FIG. 1C illustrates cooldown of adsorption tower 100a. Cooldown may prepare adsorption tower 100a for the adsorption phase. During cooldown, cold (e.g., room temperature), compressed gas may cycle back to adsorption tower 100a before entering separator 155 until adsorption tower 100a is cold enough for adsorption, which may be about 10-50° C.

Figure 1D:
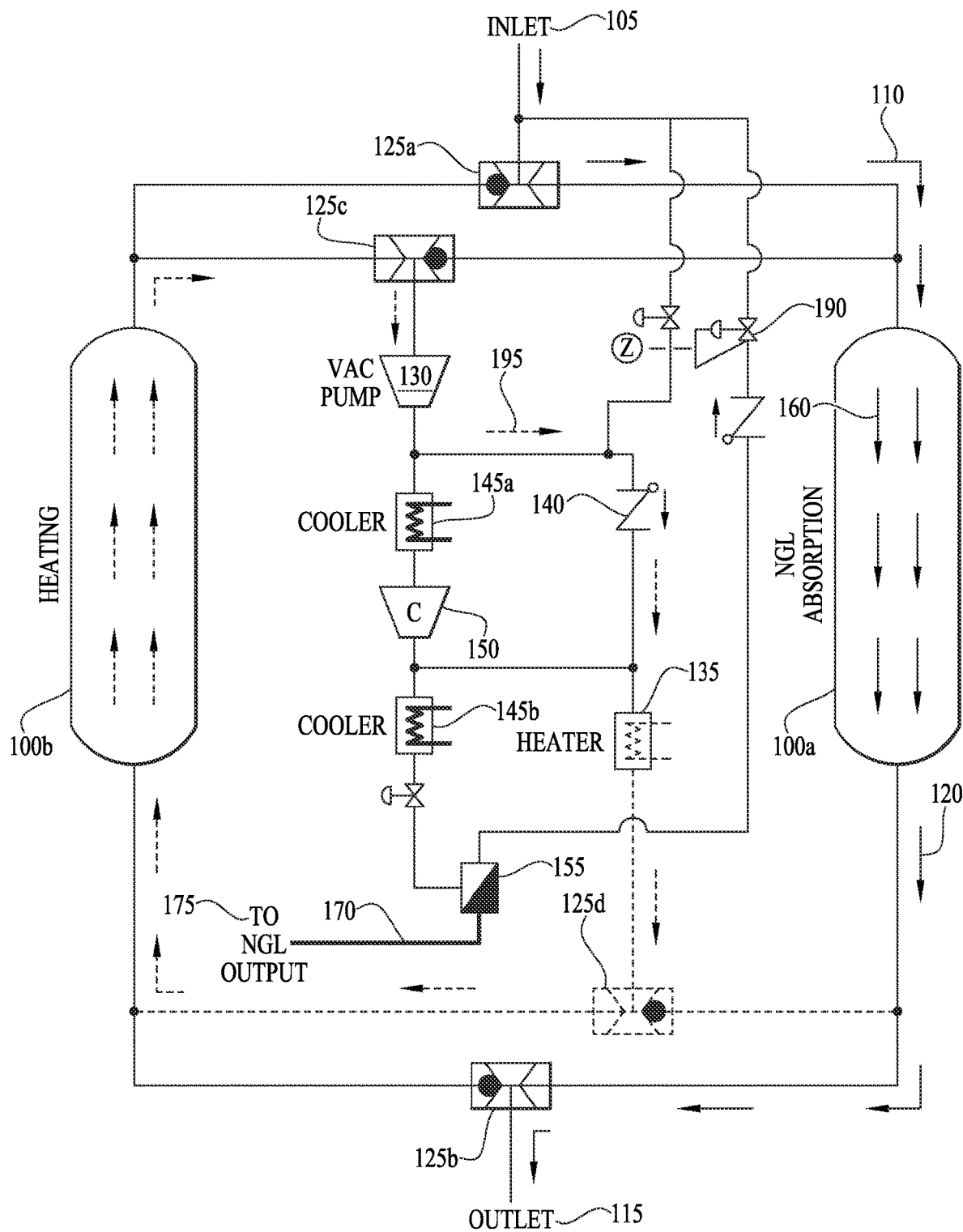

In FIG. 1D, the towers have reversed from the position of FIG. 1A, and adsorption tower 100a is adsorbing mixed natural gas entering inlet 105. Shuttle valves 125a, 125b, 125c and 125d have been switched to the opposite positions as in FIG. 1A. Adsorption tower 100b is heating now that tower 100b's adsorption phase has completed. The heating of FIG. 1D is the same as the heating of FIG. 1A, but with the adsorption towers 100a, 100b reversed. Similarly, the desorption and subsequent cooling of FIGS. 1B-1C are similarly repeated, except with the adsorption towers 100a, 100b reversed. In this manner, the adsorption and desorption cycles may be repeated continuously so long as natural gas separation is desired and/or there is associated gas produced from the oil well.

A control panel and/or computer may control the valves and/or switches of illustrative embodiments or the valves and switches may be manual. In embodiments with a control panel and/or computer, the controller may be pre-programmed to automatically switch between phases and/or towers or an operator may monitor the progress of the adsorption and/or desorption and direct the progression of the cycle. Where the controller is automatic, it may be programmed with temperatures and/or pressures (monitored by sensors well known to those of skill in the art) that when detected, trigger the next phase (adsorption, heating, desorption or cooling, as the case may be).

Figure 2:
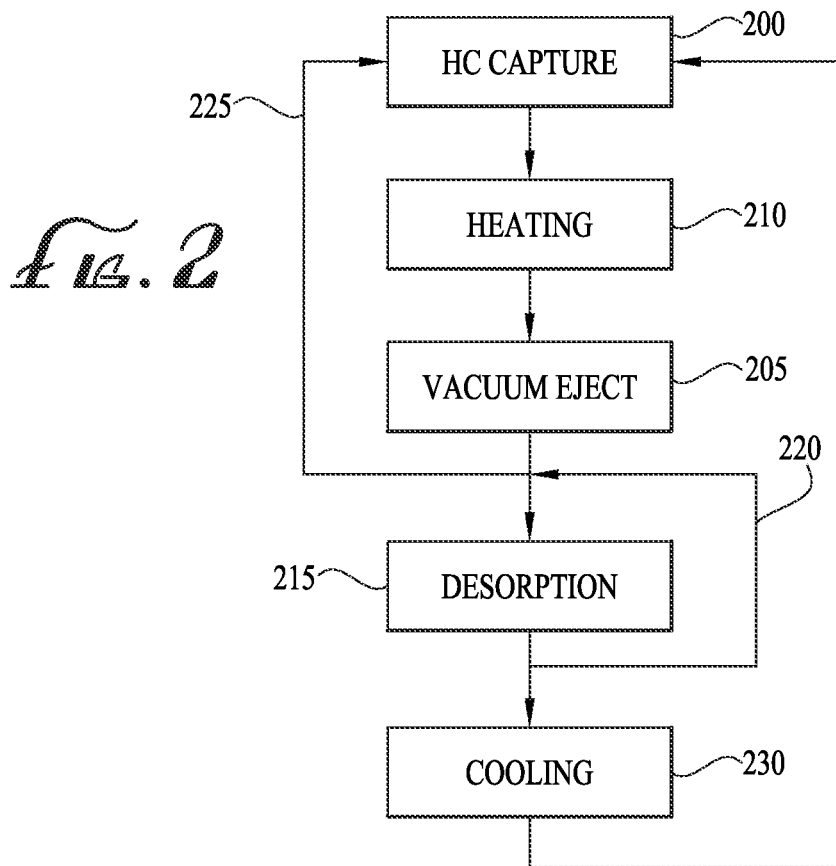
FIG. 2 is a flowchart of phases of a continuous adsorption and desorption cycle of illustrative embodiments.

FIG. 2 illustrates a flowchart of the cycle of FIGS. 1A-1D for a single adsorption tower 100a or 100b. At adsorption step 200, the adsorption tower 100a is adsorbing an associated gas stream of natural gas from an oil well. At vacuum eject step 205, vacuum pump 130 creates a vacuum and/or lowers the pressure inside adsorption tower 100a to remove hydrocarbon gas from adsorption tower 100a and then heat the gas at heating step 210, in order to increase the temperature of adsorption tower 100a until a desorption temperature is reached. Once a desorption temperature is reached, at desorption step 215, adsorbed hydrocarbons may desorb and be removed from adsorption tower 100a with vacuum pump 130 or any other fluid pump such as a centrifugal pump or positive displacement pump. A portion of desorbed hydrocarbons 220 may be diverted back to adsorption tower 100a to maintain heat of desorption and return to heating step 210. Some hydrocarbon gas 225, that does not liquefy in separator 155 may also be sent back to the inlet for capture to repeat adsorption step 200. Once desorption 215 is completed, the adsorption tower 100a may be cooled at cooling step 230, and then cycle back to adsorption step 200 to repeat the process with either adsorption tower 100a or 100b, alternating between towers.

In some embodiments, there may be only a single tower 100a or 100b, or there may be more than two towers 100a and/or 100b to permit growth in scale. More than one tower may be used at each phase, or several towers may be at different phases in the cycle at any given time.

Figure 3:
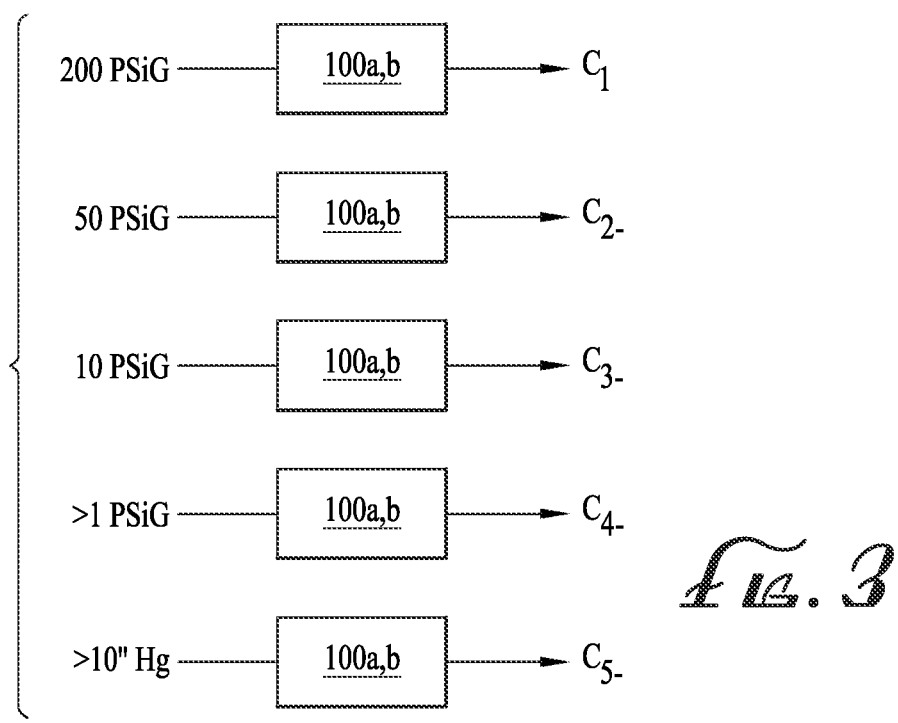
FIG. 3 is a diagram of exemplary hydrocarbon capture conditions for an adsorption system of illustrative embodiments.

FIG. 3 illustrates capture conditions for adsorption towers 100*a*, 100*b* at temperatures of 10-30° C. for an exemplary activated carbon sorbent. In some embodiments, the activated carbon sorbent may be derived from a polymer. For example, a plastic may be pyrolyzed to achieve an activated carbon structure. If desired, the particular hydrocarbons adsorbed during the adsorption phase 200 may be controlled by setting the pressure and/or temperature inside adsorption towers 100*a*, 100*b* for adsorption. As shown in FIG. 3, the pressure inside adsorption tower 100*a*, 100*b* may be greater than 200 PSIG (pounds per square inch relative to the surrounding atmosphere) at room temperature in order for the sorbent to adsorb methane (C1), at which pressure the heavier hydrocarbons would also be adsorbed or absorbed. At greater than 50 PSIG but less than 200 PSIG, ethane (C2) and heavier hydrocarbons would be adsorbed, but practically all methane would pass through the adsorption tower 100*a*, 100*b* without adsorbing. At greater than 10 PSIG, but less than 50 PSIG, propane (C3) and heavier hydrocarbons would be adsorbed, but methane and ethane would pass through adsorption tower 100*a*, 100*b* without reacting and so on. As would be appreciated by those of skill in the art, at ambient temperature, a pressure inside adsorption tower 100*a*, 100*b* less than 10 inHg, pentane (C5), butane (C4), propane (C3), ethane (C2) and methane (C1) would all pass through the tower without adsorbing or absorbing. The particular pressures and temperatures required for adsorption of particular hydrocarbons may vary based on the properties of the adsorbent selected to be layered within adsorption tower 100*a*, 100*b*. Thus, which hydrocarbons are adsorbed/absorbed may be precisely controlled through adsorbent selection and pressure and temperature as variables to control hydrocarbon adsorption and desorption/recovery within adsorption tower 100*a*, 100*b*.

Figure 4:
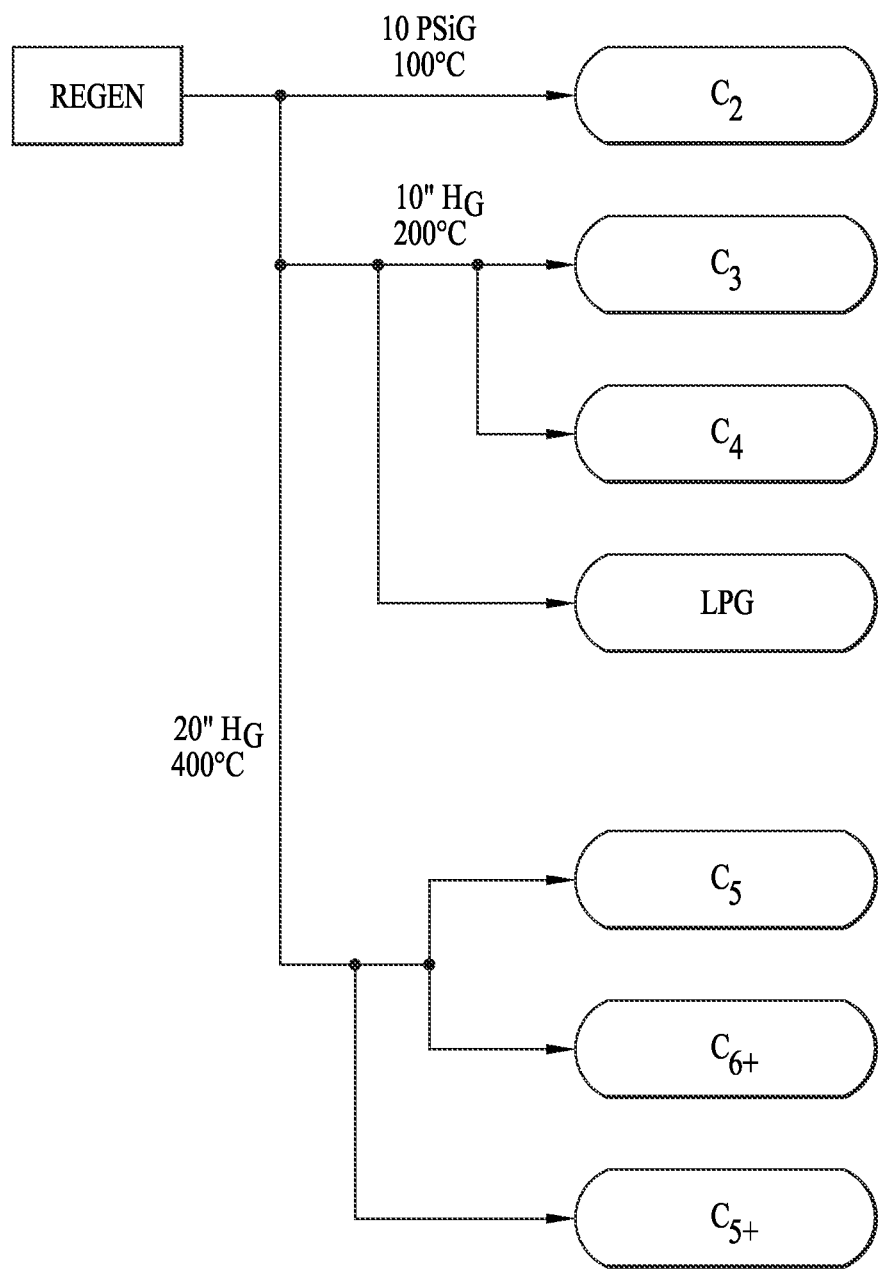
FIG. 4 is a diagram of exemplary fractionation of hydrocarbons through the adsorption separation methods of illustrative embodiments.
Figure 5:
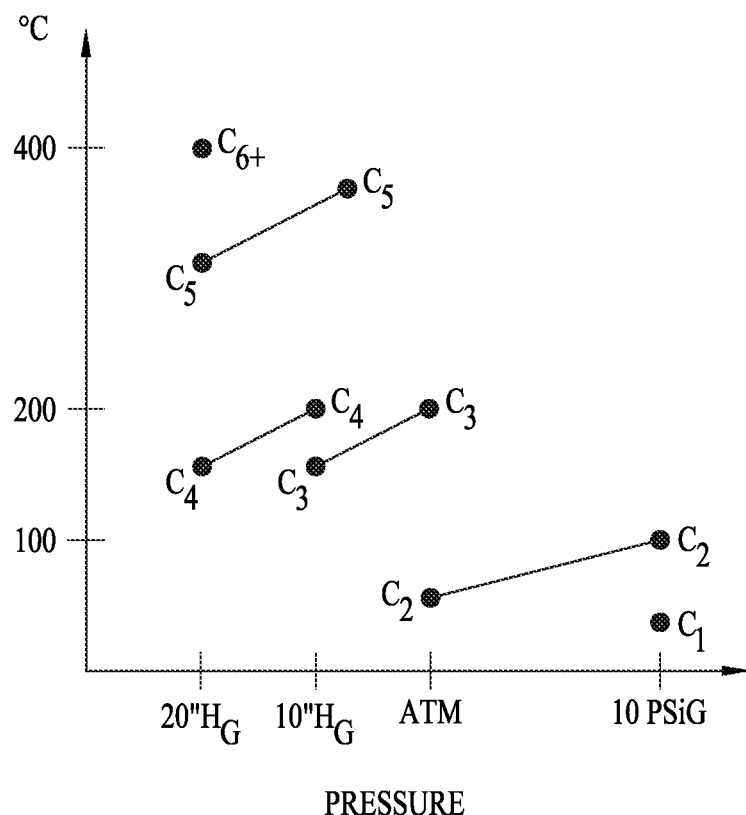
FIG. 5 is a diagram of exemplary regeneration conditions of an adsorption tower of illustrative embodiments.
Figure 6:
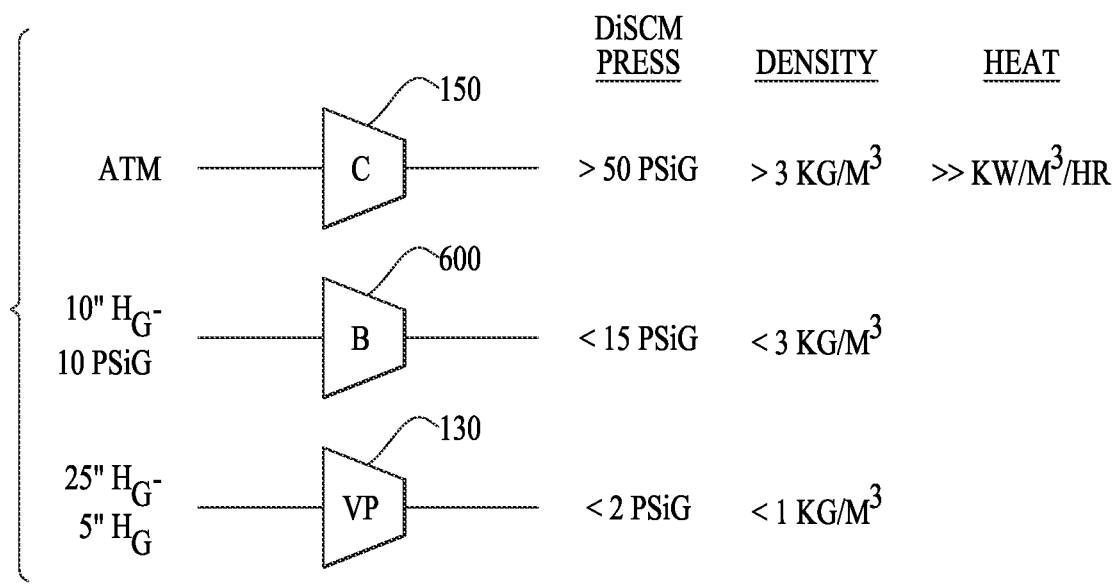
FIG. 6 is a diagram of exemplary regeneration conditions of an adsorption tower of illustrative embodiments.

By using vacuum pump 130 and heater 135 and/or a blower or compressor, the temperature may be increased with closed-loop heating through adsorption tower 100*a*, 100*b*, and then the pressure may be reduced inside adsorption tower 100*a*, 100*b* during the desorption phase 215. FIG. 4 illustrates the conditions under which hydrocarbons may be fractionated during desorption step 215, by controlling the temperature and pressure within adsorption tower 100*a*, 100*b* in steps. In this manner, no separate fractionation equipment may be required to fractionate the hydrocarbons from associated gas, other than through the adsorptive separation described herein. In the embodiment of FIG. 4, C2+ has been adsorbed or absorbed in adsorption tower 100*a* or 100*b*. If the temperature is first raised to 100° C. and the pressure inside the adsorption tower 100*a* or 100*b* is reduced to 10 PSIG, then ethane will be desorbed, but no significant amount of any other hydrocarbons may be released. High quality ethane may then be collected with little-to-no contamination from other substances. Next, the temperature may be increased to 200° C. and the pressure reduced to 10 inHg or less, which may release LPG, or C3 and C4, which may be collected. Finally, if the temperature is increased to 400° C. and the pressure is reduced to 20 inHg, the C5 and C6 hydrocarbons may be desorbed. In this manner, controlled changes in temperature and pressure within the adsorption tower may selectively release individual hydrocarbons or groups of hydrocarbons, which may be individually collected, stored, processed, sold or transported in phases or steps. In FIG. 5, regeneration conditions are further illustrated to include the ranges that a particular hydrocarbon may be regenerated. FIG. 6 illustrates the effect of including a blower 600, compressor 150 and/or vacuum pump 130 in the desorption circuit 107 to reduce or maintain a selected pressure inside adsorption tower 100*a* or 100*b*. A system of valves may be selected to include the most efficient pressure reducer within desorption circuit 107.

Figure 7:
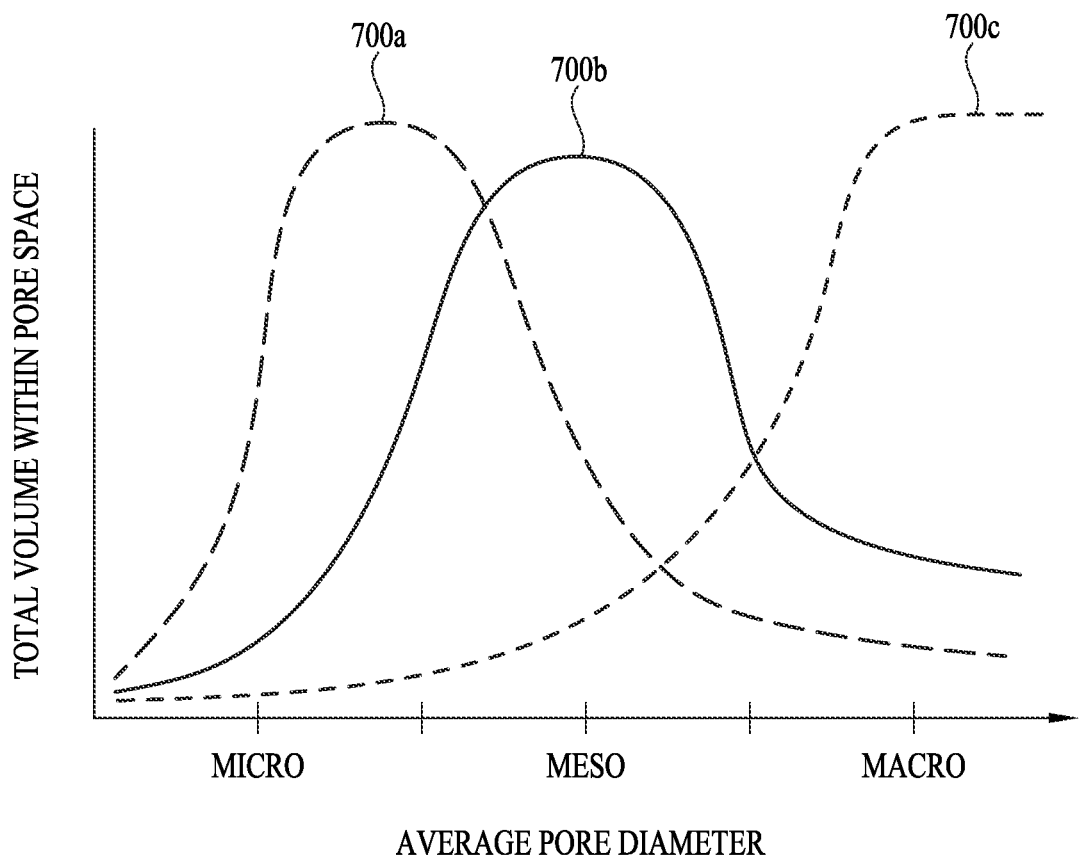
FIG. 7 is a diagram of exemplary pore size optimization for activated carbon sorbents of illustrative embodiments.

FIG. 7 illustrates a graph of a pore size optimization for activated carbon and/or polymer inside adsorption towers 100*a* and 100*b*. As illustrated, the pore size of the carbon and/or polymer sorbent may be selected to optimize adsorption or absorption of the desired gases. FIG. 7 illustrates a pore size distribution graph where the X axis is the average pore diameter, and the Y axis is the total volume inside those pore spaces. Sorbent distribution lines 700*a*, 700*b* and 700*c* illustrate the diameter and pore space distribution of three potential distinct carbon sorbents, which may be obtained through synthesis or surface modification of the sorbent. As shown, by combining different distributions of pore size, the sorbent may be selected to capture the desired paired molecules, such as ethane, pentane, butane, etc. Effectively, the attraction (e.g. Van der Waals forces) will be strongest when the average diameter of the pore is nearly the same size (a slightly larger diameter to allow for a less tortuous attachment) as the dynamic diameter of the paired molecule. In turn, an order of carbons from largest pore to smallest pore will progressively capture different molecules in their most optimal retention material and may require the least amount of total energy to eject. This result may be achieved through the synthesis or surface modification of carbons to activate the carbon such that that macropores are first formed, then on the surface inside the macropores a set of mesopores are formed, and then progressively micropores formed on the surface of the mesopores. Whether steam or chemical activation, the chemistry, the temperature of activation and the duration of activation and modifications pre or post activation all may tune the amorphous carbon to the characteristics that are most desired. Increased surface area while promoting the pore range or surface charge properties that best provides the desired enhanced selectivity. This may provide for a best total pore volume and also a less tortuous path for the smaller molecules to slip through and into the body of the carbon. Furthermore, a single carbon material may perform well in most compositions. When pore sizes and distributions are tuned to the gas composition desired to be captured, separated and/or stored, the highest specific weight would be attained. The kg of hydrocarbons captured/retained in each kg of carbon material may be maximized.

Figure 8:
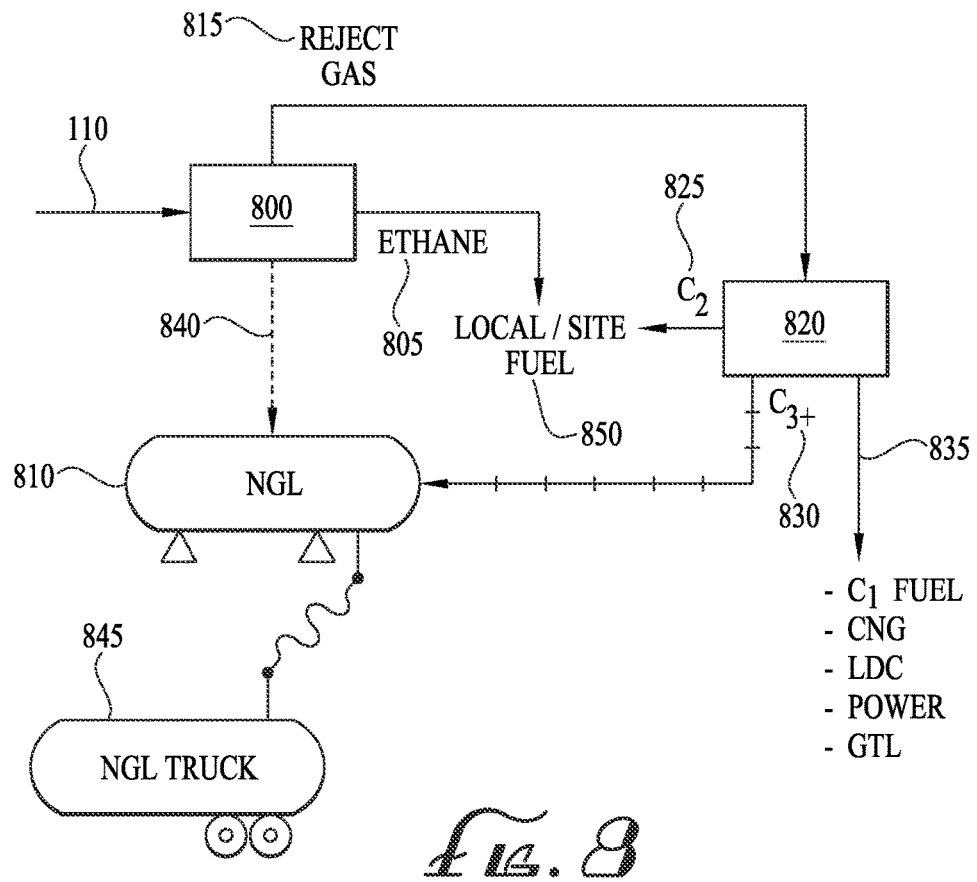
FIG. 8 is a schematic diagram of a natural gas treatment system employing an MRU plus polish by adsorption of illustrative embodiments.

The adsorption system of illustrative embodiments, for example, the adsorption system of FIGS. 1A-1D, may be employed to polish the output from an MRU or J-T unit. As illustrated in FIG. 8, mixed natural gas stream 110, for example a gas stream produced from an oil well, may first be processed in refrigeration unit 800, which may be an MRU or J-T unit. Heavier natural gas liquids, such as butanes and heaver hydrocarbons, may be separated by refrigeration unit 800 and sent to NGL storage container 810, for example, a cryogenic, refrigerated or pressurized storage tank and/or NGL truck 845. Some processed ethane 805 may be separated in refrigeration unit 800, but refrigeration unit 800 may not be cold enough to separate enough ethane, propane and butane from rejected gas stream 815 to provide pipeline quality methane fuel or to monetize very much of the ethane from the mixed gas stream 110. The rejected gas stream 815 from MRU and/or J-T unit, consisting of methane, ethane and propane, may then be sent to the inlet 105 of adsorption system 820. Adsorption system 820 may operate as described herein to employ one or more adsorption towers 100*a*, 100*b* to separate and collect residual ethane 825 and residual propane 830 from rejected gas stream 815 exiting refrigeration unit 800. Residual propane 830 may be collected and combined with the MRU NGL output 840 in NGL storage container 810. Ethane 805 from refrigeration unit 800 as well as residual ethane 825 may be send to a local site, used as fuel, sold or otherwise monetized. In this manner, because of inclusion of adsorption system 820, a higher percentage of NGLs from mixed gas stream 110 may be separated and utilized where it is most needed, rather than being flared or wasted. Similarly, methane exiting adsorption system 820 may be substantially pure methane (90% methane or greater) and may be therefore be employed as C1 fuel, compressed natural gas, power, methanol or sent to a local distribution company.

Figure 9:
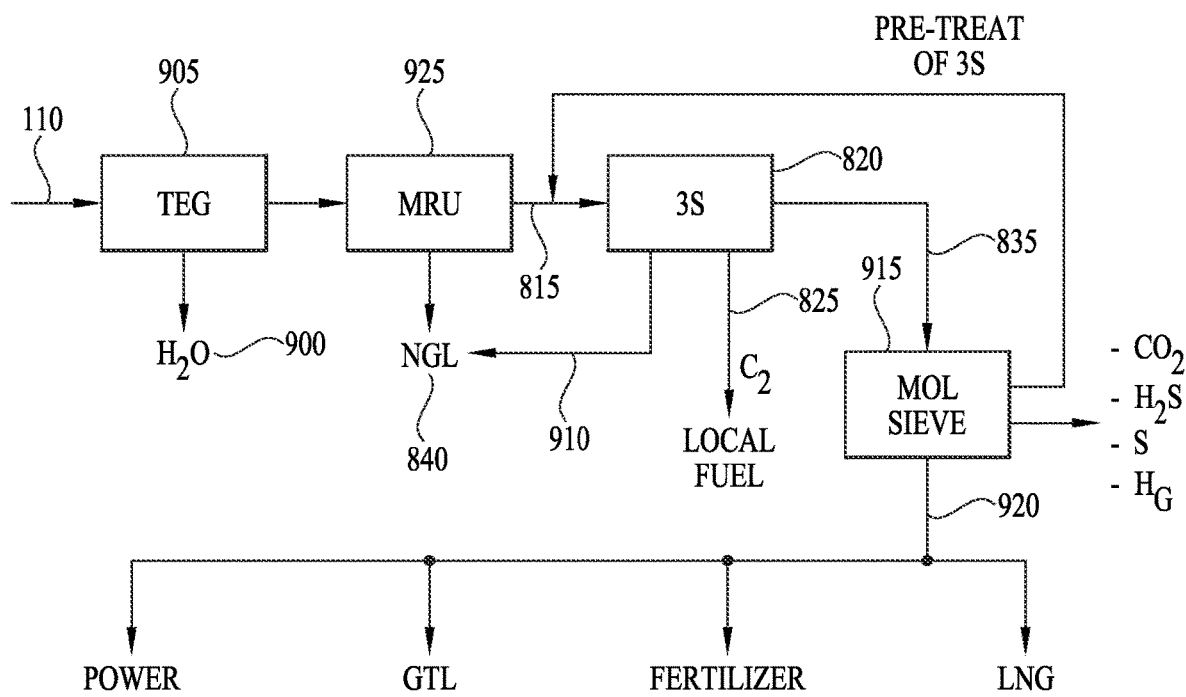
FIG. 9 is a schematic diagram of a natural gas treatment system employing an MRU plus polish by adsorption of illustrative embodiments.

FIG. 9 illustrates an additional embodiment of adsorption system 820 being used to polish the output of an MRU 925. The embodiment of FIG. 9 may be beneficial in smaller-scale applications than that of FIG. 8. As shown in FIG. 9, water 900 may first be removed from mixed natural gas stream 110 using triethylene glycol (TEG) 905. In some embodiments, rather than TEG 905, a humidity adsorbent may be included in an additional adsorbent tower, or as the first layer inside the carbon tower 100*a*, 100*b*. In such instances, an adsorbent may be included that can select for humidity to absorb water vapor. MRU 925 may then send NGL output 840 to a storage or transportation means. Rejected gas 815 from MRU 925 may be further purified by molecular sieve 915 to remove carbon dioxide, hydrogen sulfide, sulfur and mercury, and may then be received as input into adsorption system 820. Adsorption system 820 may improve the efficiency by removing additional ethane 825 and additional NGLs 910. The remaining methane 835 may be LNG-quality methane 920, which may be liquefied as LNG, or used as power, for fertilizer, or other gas to liquids refining, such as producing liquid synthetic fuels from methane-rich gas.

Figure 10:
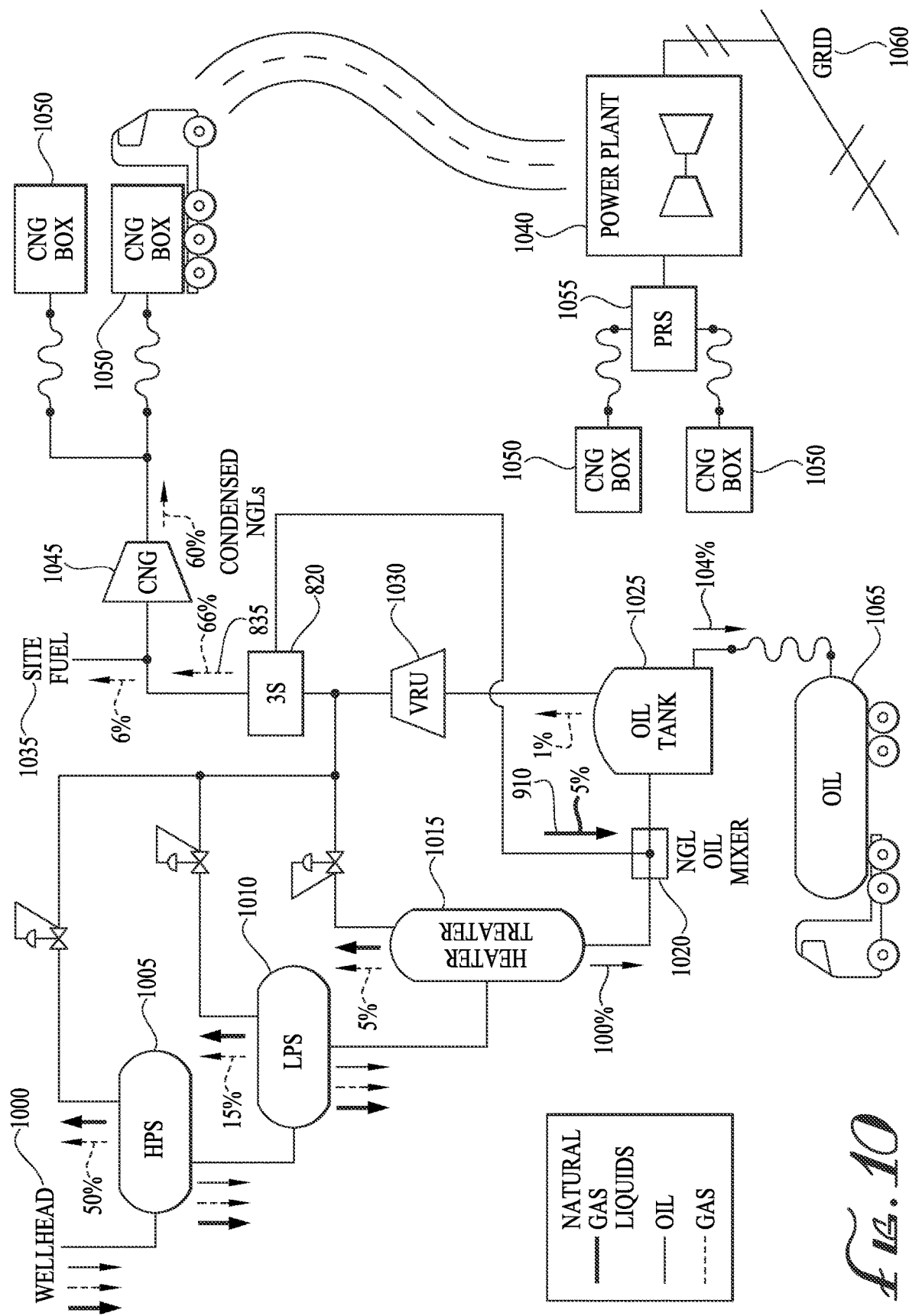
FIG. 10 is a schematic diagram of a system for mixing NGLs with oil of illustrative embodiments.

In some embodiments, natural gas liquids may be separated from wellhead production fluid and combined with the oil in order to increase oil production. Illustrative embodiments may increase oil production from a well by about 4% or up to 10% depending on gas-oil-ratio (GOR) and gas composition. FIG. 10 illustrates exemplary embodiment of NGLs being separated and mixed with oil to increase and improve oil production volumes. The percentages shown in FIG. 10 are exemplary molar percentages of the oil flow on one hand, and the NGL/gas flow on the other hand. As shown in FIG. 10, oil, gas and NGLs are produced from wellhead 1000. As shown in this example, 50% of gas and NGLs are separated from the wellhead production fluid in high pressure separator 1005, and then proceed from high pressure separator 1005 to adsorption system 820. The remaining mixed wellhead production fluid proceeds to a second phase of separation at low pressure separator 1010, where 15% of the gas and NGLs are further separated from the wellhead production fluid and sent to adsorption system 820. The remaining wellhead production fluid then continues to heater treater 1015 where the remaining NGLs and gas are separated from the oil. As shown, 100% of oil exits heater treater 1015 to continue to NGL oil mixer 1020, whereas 5% of NGLs and gas are sent from the output of heater treater 1015 to adsorption system 820. Adsorption system 820 then may separate the gas from the NGLs using towers 100*a*, 100*b* and the methods described herein. Condensed NGLs from adsorption system 820 may then be sent to NGL oil mixer 1020. In the embodiment shown in FIG. 10, five molar percentage of NGLs have been sent to NGL oil mixer 1020. The NGL and oil mixture then proceeds to oil tank 1025, where about 1% of NGLs may revaporize or boil-off. Vapor recovery system 1030 may compress and inject the vaporized gas to adsorption system 820. The oil, with increased volume of 4% in this example due to beneficial NGL mixing, may then be sent to oil tanker 1065 thereby increasing oil production by 4%. Gas separated in adsorption system 820 may then be used as site fuel 1035, or may be compressed in CNG compressor 1045 and transported as compressed natural gas to power plant 1040 in order to supply power to grid 1060. Additionally or alternatively, compressed natural gas may be stored and/or transported in boxes 1050. Pressure reduction system 1055 may be employed where needed.

Figure 11:
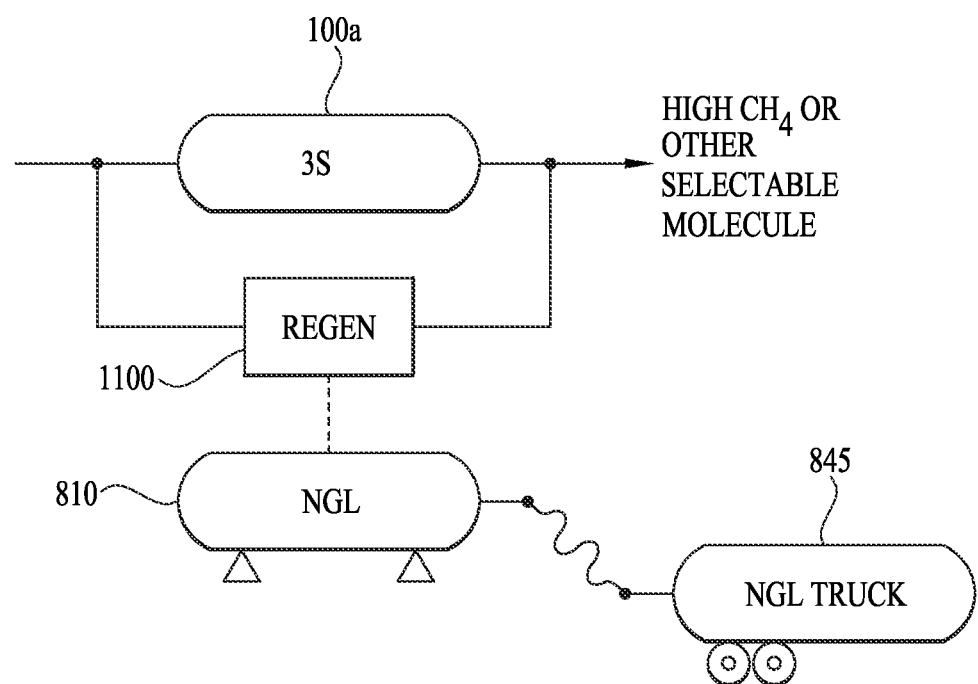
FIG. 11 is a schematic diagram of stationary adsorption and regeneration of illustrative embodiments.
Figure 12:
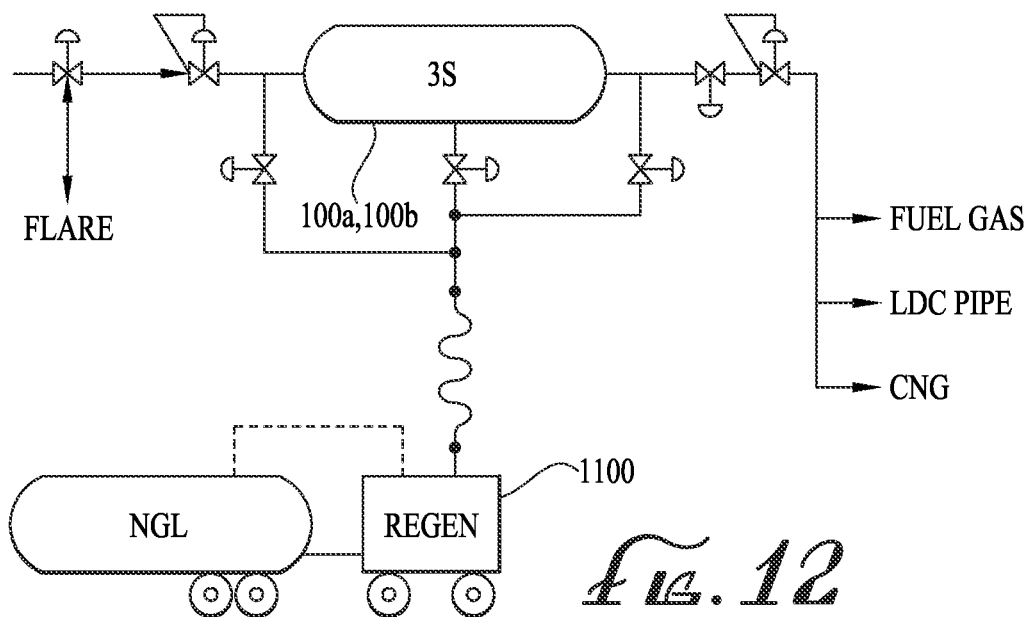
FIG. 12 is a schematic diagram of stationary adsorption with mobile regeneration of illustrative embodiments.
Figure 13:
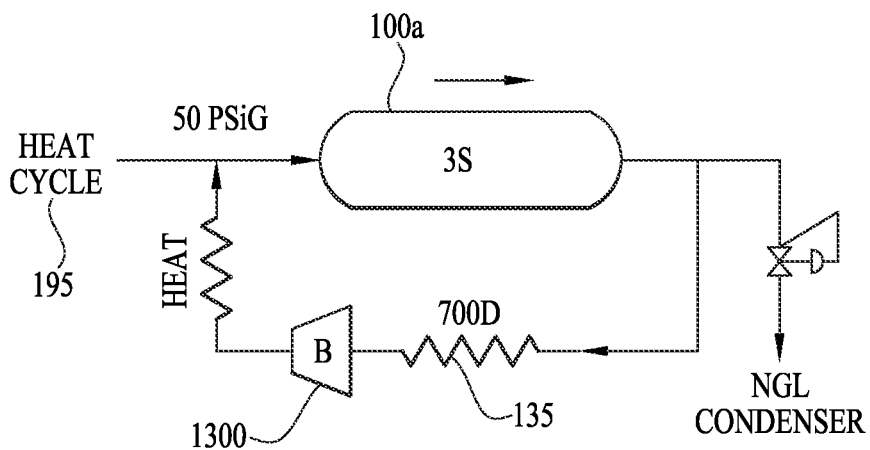
FIG. 13 is a schematic diagram of a mobile closed-loop heating circuit of illustrative embodiments.
Figure 14:
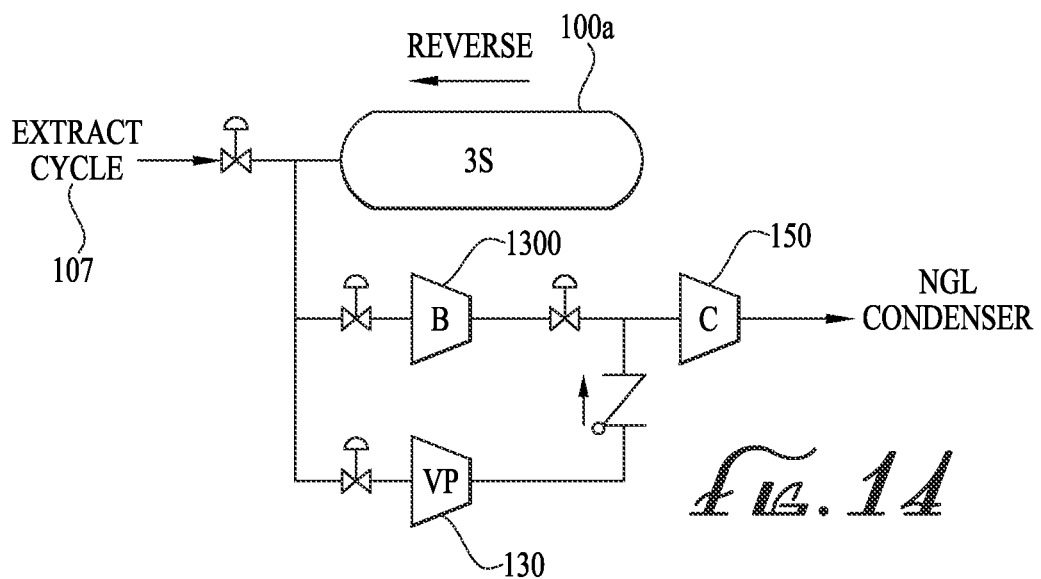
FIG. 14 is a schematic diagram of a mobile desorption circuit of illustrative embodiments.

In some embodiments, separation and regeneration equipment may all be located onsite proximate a well. FIG. 11 illustrates an exemplary embodiment where regeneration/desorption equipment 1100, such as equipment comprising closed-loop heating circuit 195 and/or desorption circuit 107 remains onsite with adsorption tower 100*a* and/or 100*b*. In certain embodiments, adsorption tower 100*a* and/or 100*b* may be located onsite proximate a well, but regeneration equipment 1100 may be onboard a mobile vehicle and may move from wellsite to wellsite. Mobility of regeneration equipment 1100 may allow NGLs to be collected and aggregated from various wellsites and may also reduce the footprint of adsorption equipment that more permanently resides wellsite. FIG. 12 shows an illustrative embodiment of stationary adsorption towers 100*a*, 100*b* at a wellsite with mobile regeneration equipment 1100. FIG. 13 illustrates an illustrative example of a mobile heating equipment connecting to stationary adsorption tower 100*a* to form closed loop heating circuit 195. In the example of FIG. 13, blower 1300 and heater 135 onboard a mobile unit may be used to connect and circulate heating fluid through adsorption tower 100*a* at 50 PSIG in a closed loop. FIG. 14 illustrates mobile desorption phase equipment connecting to stationary adsorption tower 100*a* to form desorption circuit 107.

Figure 15:
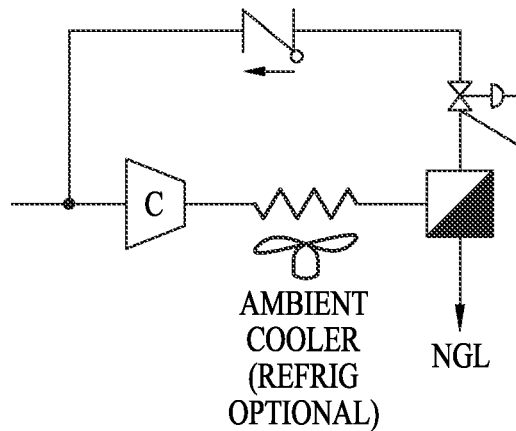
FIG. 15 is a schematic diagram of NGL condenser power sources of illustrative embodiments.
Figure 16:
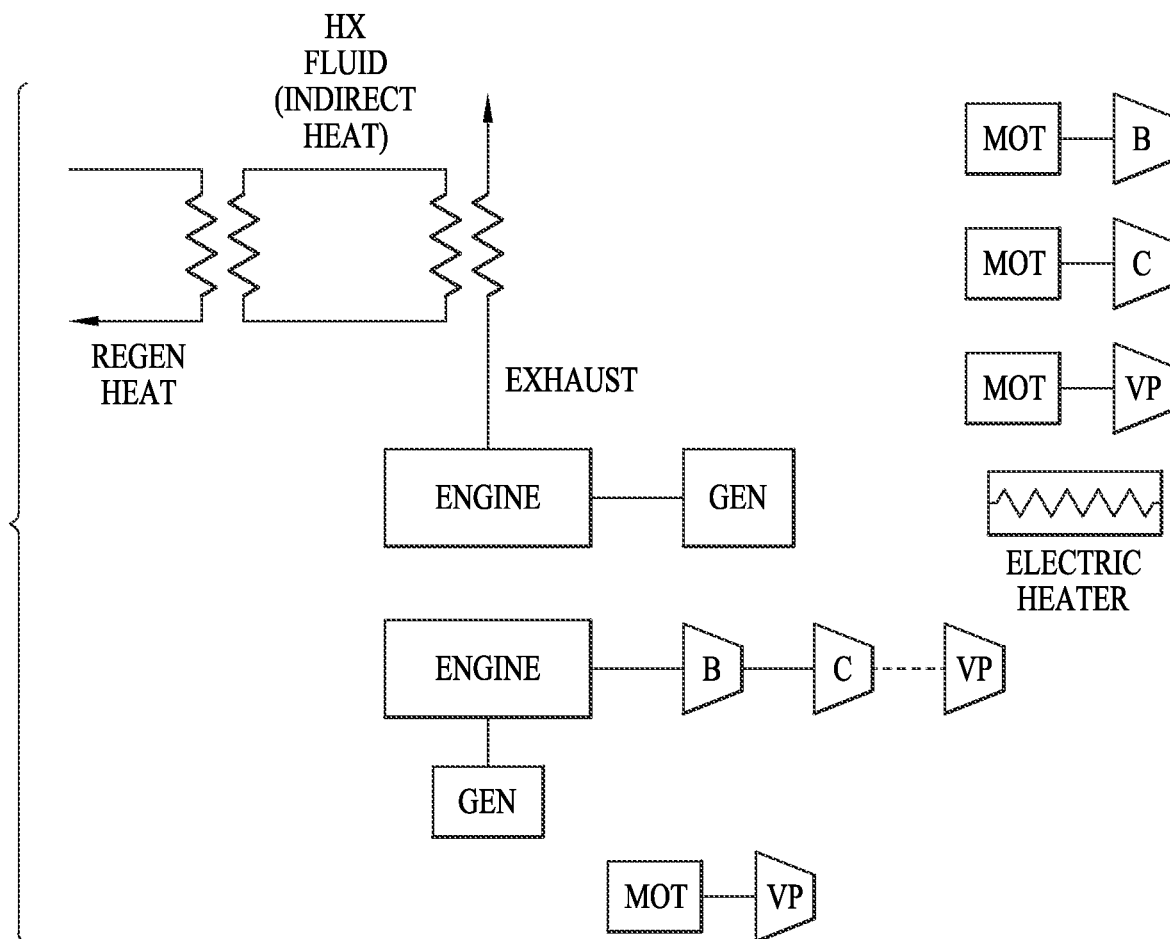
FIG. 16 is a schematic diagram of heat power sources of illustrative embodiments.

FIG. 15 and FIG. 16 illustrate NGL condenser and heat power sources of illustrative embodiments. In FIG. 16, an indirect heating circuit may be employed as a safety method, to prevent natural gas going through the exhaust, which in case of a failure may prevent a combustion event.

A natural gas adsorptive separation system and method has been described. Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the scope and range of equivalents as described in the following claims. In addition, it is to be understood that features described herein independently may, in certain embodiments, be combined.

What is claimed is:
1. A natural gas separation system, comprising:
 a plurality of adsorbent towers coupled to a set of switches, the set of switches directing a natural gas inlet flow through one of:

a first adsorbent tower of the plurality of adsorbent towers, when the set of switches are in a first position; or a second adsorbent tower of the plurality of adsorbent towers, when the set of switches are in a second position;

the first position further coupling the second adsorbent tower to a closed-loop circuit, comprising a fluid differential pressure pump and a heater, wherein gaseous fluid circulates through the second adsorbent tower, the vacuum pump and heater in a loop until the inlet of the vacuum pump is within a selected temperature of the output of the heater;

the first position further coupling the second adsorbent tower to a desorption circuit comprising:

the vacuum pump;

a compressor;

a heat exchanger; and a gas-liquid separator; and a series of valves that select between the closed-loop circuit and the desorption circuit in the first position;

wherein in the first position:

methane or other unwanted light hydrocarbons exists the first adsorbent tower through an outlet; and natural gas liquids exit the separator when the desorption circuit is selected.

2. The natural gas separation system of claim 1, wherein the natural gas inlet flow is gas output from one of a wellhead, wellpad, gas pipeline, an MRU, a JT or other refrigeration system.

3. The natural gas separation system of claim 1, wherein the desorption circuit is located on a mobile unit.

4. The natural gas separation system of claim 1, wherein the plurality of adsorbent towers comprise activated carbon sorbent.

5. A method of separating natural gas, comprising:

directing a natural gas mixture comprising a plurality of different hydrocarbon compounds through an activated carbon adsorption tower until the activated carbon adsorption tower is saturated;

collecting methane from the output of the activated carbon adsorption tower;

heating the saturated carbon adsorption tower with adsorbate as a heating fluid using a vacuum pump and a heater in a closed loop circuit with the carbon adsorption tower until the input to the vacuum pump is within a specified temperature of the output of the heater;

lowering the pressure in the heated activated carbon adsorption tower using the vacuum pump to desorb at least one hydrocarbon compound of the plurality of different hydrocarbon compounds;

compressing and cooling the desorbed at least one hydrocarbon compound;

separating the cooled and compressed at least one hydrocarbon compound into gas and liquid in a fluid separator; and collecting the liquid from the fluid separator.

6. The method of claim 5, wherein the lowering the pressure in the heated activated carbon adsorption tower occurs in stages to selectively desorb an individual hydrocarbon compound of the plurality of hydrocarbon compounds.

7. The method of claim 5, further comprising repeating the heating and lowering the pressure to selectively desorb a series of individual hydrocarbon compounds of the plurality of hydrocarbon compounds one at a time.

8. The method of claim 5, further comprising mixing the liquid with oil.

9. The method of claim 5, further comprising cooling the activated carbon adsorption tower with at least a portion of the cooled and compressed at least one hydrocarbon compound to prepare the activated carbon adsorption tower for adsorption.

10. The method of claim 9, further comprising a second activated carbon adsorption tower, wherein the first and second activated carbon adsorption tower alternate between adsorption and desorption in a continuous cycle.

11. A method of separating individual hydrocarbons from a mixed stream of hydrocarbons comprising:

directing a hydrocarbon mixture comprising a plurality of different hydrocarbon compounds through an activated carbon adsorption tower;

controlling which hydrocarbons of the plurality of different hydrocarbons are adsorbed by the activated carbon adsorption tower by controlling the temperature and pressure within the activated carbon adsorption tower;

collecting hydrocarbons that are not adsorbed by the activated carbon adsorption tower from the output of the activated carbon adsorption tower; and heating and/or lowering the pressure in the activated carbon adsorption tower in stages to desorb previously adsorbed hydrocarbons one at a time by type or carbon number.

* * * * *